United States Patent [19]

Firey

[11] 4,372,256
[45] Feb. 8, 1983

[54] CHAR BURNING FREE PISTON GAS GENERATOR

[76] Inventor: Joseph C. Firey, P.O. Box 15514, Seattle, Wash. 98115

[21] Appl. No.: 264,105

[22] Filed: May 14, 1981

[51] Int. Cl.³ .................... F02B 71/00; F02B 71/02
[52] U.S. Cl. ........................................ 123/23; 48/61; 48/DIG. 8; 123/46 A; 123/179 H
[58] Field of Search .................. 123/23, 46 R, 46 A, 123/179 H; 48/61, DIG. 8

[56] References Cited

U.S. PATENT DOCUMENTS

| | | | |
|---|---|---|---|
| 2,396,524 | 3/1946 | Nettel | 123/23 |
| 2,425,850 | 8/1947 | Welsh | 123/46 R |
| 3,149,617 | 9/1964 | Luderer | 123/46 R |
| 3,370,576 | 2/1968 | Huber | 123/46 R |
| 3,981,277 | 9/1976 | Abom | 123/23 |

FOREIGN PATENT DOCUMENTS 651973  11/1962  Canada ........................ 123/46

*Primary Examiner*—William A. Cuchlinski, Jr.

[57] ABSTRACT

A free piston gasifier is described capable of burning porous solid char fuels alone or with oil fuels. Air is forced into the char pore spaces during the compression process of the cycle in order to achieve the rapid burning needed for reasonable gasifier speeds. Fresh char fuel is periodically furnished into a combustion chamber and ashes are removed therefrom. Gasifier output is controlled by control of intake air density.

34 Claims, 26 Drawing Figures

CHAR BURNING FREE PISTON GAS GENERATOR

BACKGROUND OF THE INVENTION

1. Field of the Invention

This invention is in the field of free piston gas generators and particularly the field of free piston gas generators fueled with char fuels such as coal or charcoal.

2. Description of the Prior Art

Prior art free piston gas generators comprise one or more air compressor pistons and cylinders, one or more power pistons and cylinders, one or more bounce pistons and cylinders, a diesel fuel supply and injection system and necessary air compressor valves, power piston intake and exhaust ports, etc. Usually an air compressor piston, a power piston and a bounce piston are assembled together as a single piece and two such pieces operate together, symmetrically about the diesel fuel combustion system, as a single free piston gas generator.

Such a diesel fueled free piston gas generator differs from a diesel fueled internal combustion engine in the following ways:

a. No net shaft work output emerges from a free piston gas generator.

b. The cycle work of the free piston gas generator is fully absorbed internally to drive the air compressor.

c. The useful net output of a free piston gas generator is either the exhaust gas at pressure or this exhaust gas plus compressed air.

d. For a diesel fueled internal combustion engine the cycle work emerges as the useful net shaft work output, exhaust gas is not at high pressure, and compressed air is not usually delivered outside the engine.

Prior art diesel fueled free piston gas generators have been used as compressed air supply sources and as high pressure exhaust gas supply sources for driving gas turbine engines. References A, B and C describe various such prior art uses of diesel fueled free piston gas generators. These prior art free piston gas generators have seen only very limited use for driving gas turbine engines or as sources of high pressure exhaust gas principally for the following reasons:

a. The combination of a free piston gas generator and a gas turbine engine is more complex and less efficient, particularly at part load, than a diesel internal combustion engine.

b. These diesel fueled free piston gas generators cannot efficiently produce an exhaust gas which is a fuel gas.

c. These prior art free piston gas generators require use of a liquid fuel and these are now very expensive.

The term free piston mechanism is used herein and in the claims to mean all elements of a free piston gas generator except the fuel supply and combustion systems. Several different types of free piston mechanism are known as shown, for example, in references D, E, and F.

Free Piston Gasifier References

A. Bibliography, J. A. Scanlon & H. B. Jennings, "Free Piston Engine and Compressors," Mech. Engr., Vol. 79: 339 (Apr. 1957).

B. A. L. London, Trans. ASME, (Feb. 1955).

C. Flynn, "Observations on 25000 Hrs. of Free Piston Engine Operation," Trans. SAE, Vol. 65, p. 508, 1957.

D. "Internal Combustion Engines," E. F. Obert, page 713, Int'l. Textbook, 3rd Ed., 1968.

E. "Combustion Engine Processes," L. C. Lichty, page 13, McGraw-Hill, 1967.

F. "The Internal Combustion Engine in Theory and Practice," Vol. 2, C. F. Taylor, p. 580, MIT Press, 1977.

Cross References to Related Applications

This application is related to the below listed U.S. patent applications by the same inventor:

a. "Cyclic Char Gasifier," Ser. No. 06/121973, filing date Feb. 15, 1980, now abandoned Group Art Unit 173 b. "Porous Burner Diesel Engine," Ser. No. 06/138988, filing date Apr. 10, 1980, Group Art Unit 342 c. "Engine Steam Stratifier," Ser. No. 06/148401, filing date May 9, 1980, now U.S. Pat. No. 4,333,423 Group Art Unit 342 d. "Improved Char and Oil Burning Engine," Ser. No. 06/183182, filing date Sept. 2, 1980, now abandoned, Group Art Unit 342.

SUMMARY OF THE INVENTION

The char burning free piston gas generators of this invention can burn char fuels in solid form or other char fuels containing volatile matter provided these solid fuels are porous or become porous when the volatile matter is distilled off. These char burning gasifiers comprise, a free piston mechanism as described hereinafter, fitted with a char burning combustion chamber, means to refuel said combustion chamber, means to remove ashes from said combustion chamber, and means of controlling said refueling and ash removal processes so that an adequate quantity of char fuel is inside the combustion chamber during gasifier running. The char fuel is contained within a porous or ported combustion chamber made of ceramic or other high temperature material. During the compression process the power piston of the free piston mechanism forces air through the ports of pores of the combustion chamber and into the pore space within the char fuel. In this way the char fuel comes into intimate contact with the oxygen in the air and rapid oxidation of the char to carbon monoxide and/or carbon dioxide occurs readily within the char pores provided the temperature of the char is sufficiently high. Since within the pores carbon is present in great excess over the oxygen, the predominant oxidation product within the pores is carbon monoxide, any carbon dioxide formed tending to be reduced to carbon monoxide by the carbon of the pore surfaces. During the expansion process of the power piston the gaseous oxidation products now flow out of the char pore space and into the volume of the power cylinder. If extra air and oxygen are available in the cylinder volume outside the char pore space, carbon monoxide can be burned to carbon dioxide by this extra oxygen. We thus see that two principal forms of this gasifier, as well as combinations of these two forms, can be constructed: a carbon monoxide generating gasifier wherein almost all of the air and oxygen are compressed into the char pore space to react principally to carbon monoxide; and a carbon dioxide generating gasifier wherein no more than half of the air and oxygen are compressed into the char pore space, the remaining oxygen being held outside to subsequently burn the emerging carbon monoxide to carbon dioxide. The carbon monoxide generating gasifier will be preferred where a fuel gas product at pressure is desired for use elsewhere. The carbon dioxide generating gasifier, a dual process, will be preferred where the principal useful gasifier product is compressed air drawn from the gasifier compressor itself. Char burning gasifiers can also be used wherein a gas turbine engine is driven by the char burning gasifier exhaust gas and in this case the carbon monoxide generating gasifier, a unit process gasifier, may be preferred with the carbon monoxide being burned to carbon dioxide after the char burning gasifier but within the combustion chamber of the gas turbine engine. In this way use of a unit process gasifier of this invention provides a method for burning coal in gas turbine-steam turbine cycle power plants, which heretofore have used only oil or gas as fuel due to blade problems in the gas turbine when coal is used.

The gasifier can be started by heating up the char fuel sufficiently to react rapidly with the oxygen in the air and this can be done in several ways, as by simple reciprocation of the free piston mechanism or by starting with special diesel fuels and then the hot oxygen containing diesel fuel combustion products will heat up the char and commence the char burning.

Control of gasifier output is preferably done by controlling the amount of air placed in the power cylinder during the air intake process and this is most easily done by controlling the gasifier intake air density by control of intake absolute pressure. The intake pressure can be thusly controlled either with an air intake throttle or with an adjustable intake supercharger or with a combination of intake throttle and adjustable supercharger. With this intake pressure control of output, the char fuel quantity within the combustion chamber is preferably greater than needed to burn with the oxygen available in a single gasifier cycle. In this way the available oxygen can be very nearly completely utilized if desired. Of course, as the gasifier runs on, the char is being burned up, and hence, at intervals, new char fuel must be refueled into the combustion chamber to replace that which has burned up.

A preferred way to stop the gasifier is to recirculate exhaust gas, which is essentially oxygen free, into the gasifier intake and the char stops burning in the absence of oxygen.

A principal beneficial object of this invention is to make available a free piston gasifier capable of efficiently burning solid carbonaceous fuels alone or in combination with other fuels both liquid and gaseous. Known fuel reserves of such solid fuels are far larger than of liquid or gaseous fuels. Additionally, solid carbonaceous fuels can be prepared from renewable vegetable matter sources.

Figure 2:
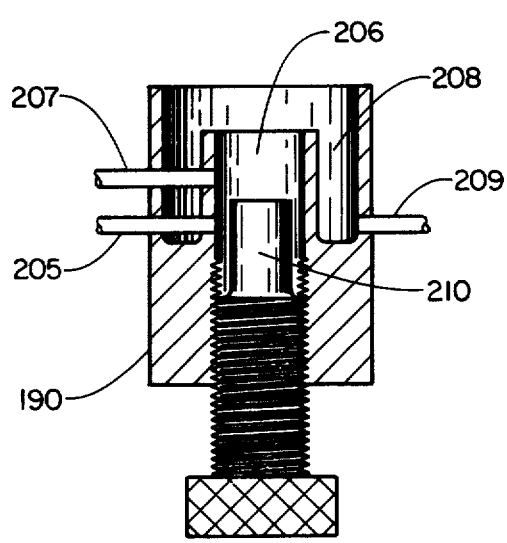
Figure 3:
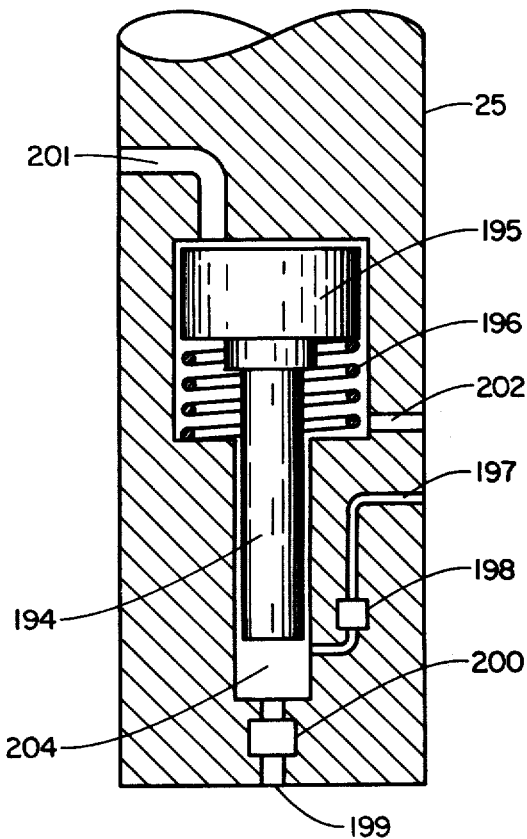

One type of oil fuel metering cup is shown in FIG. 2 suitable for use with the oil pumping and pouring unit shown in FIG. 3.

Figure 5:
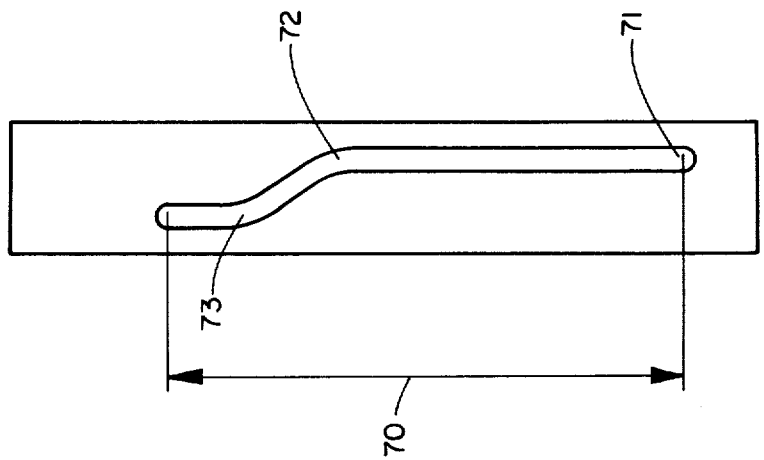
Figure 4:
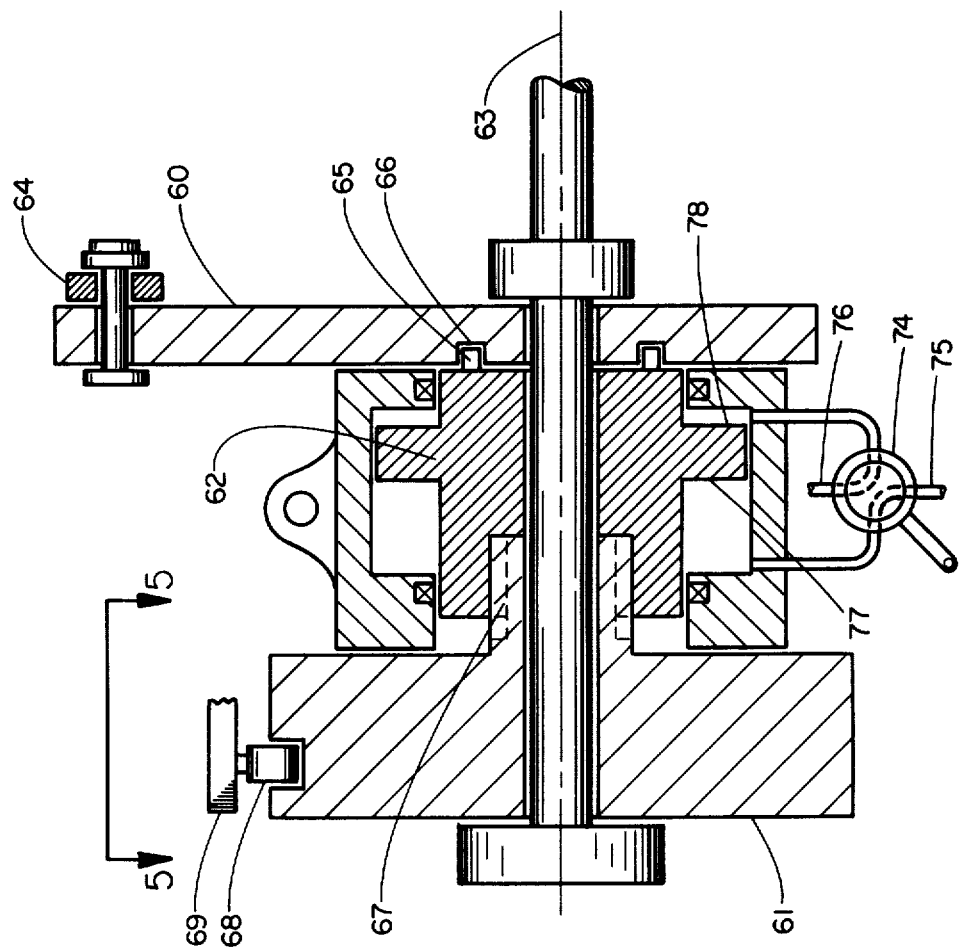

A portion of a drive means, suitable for refuel mechanism driving is shown in FIG. 4 and is also suitable for ash removal mechanism driving, and reload mechanism driving, and moveable combustion chamber driving. A developed arc section of the barrel cam portion of the drive means of FIG. 4 is shown in FIG. 5.

Figure 6:
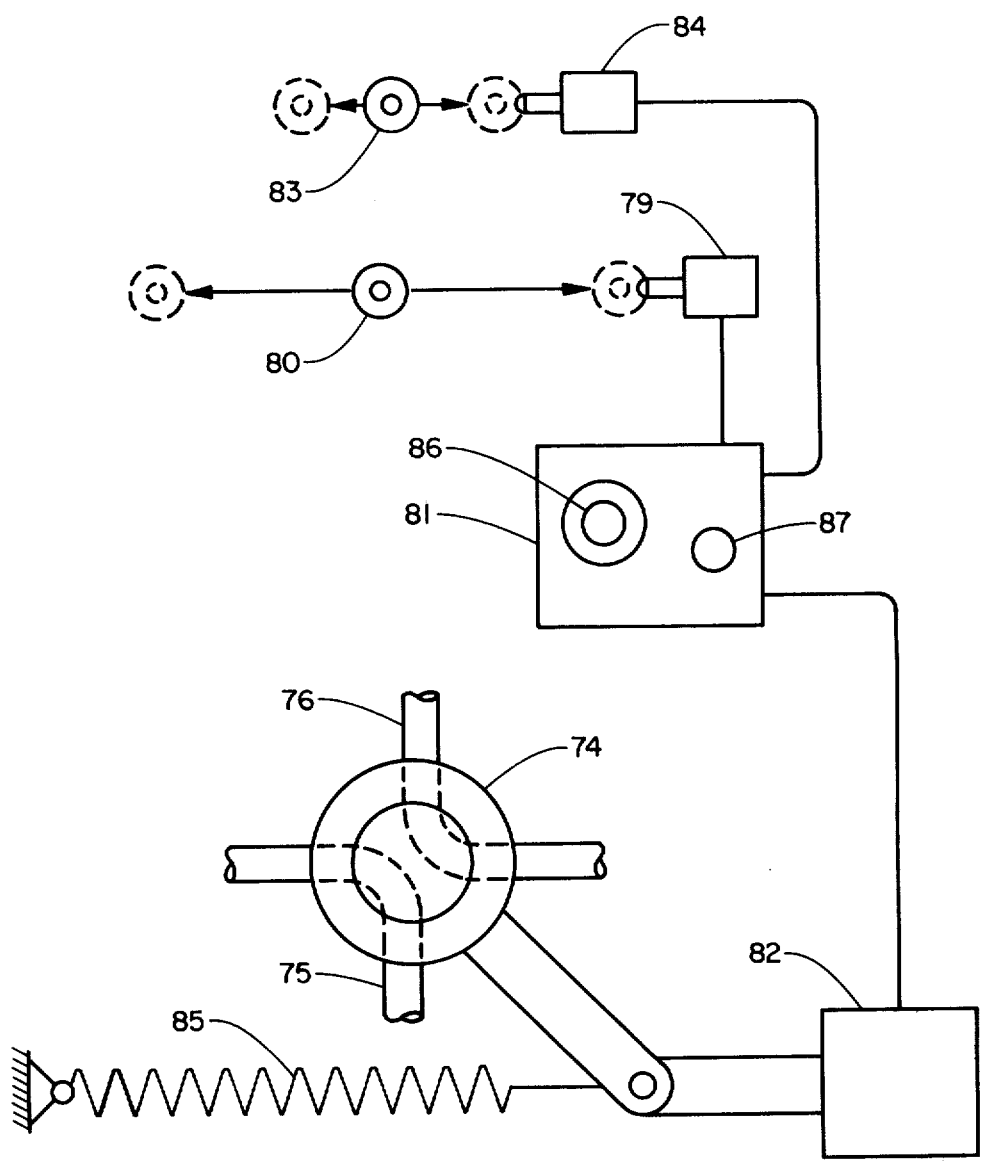

A refuel interval control scheme is shown in FIG. 6 which can be used with the drive means of FIG. 4.

Figure 7:
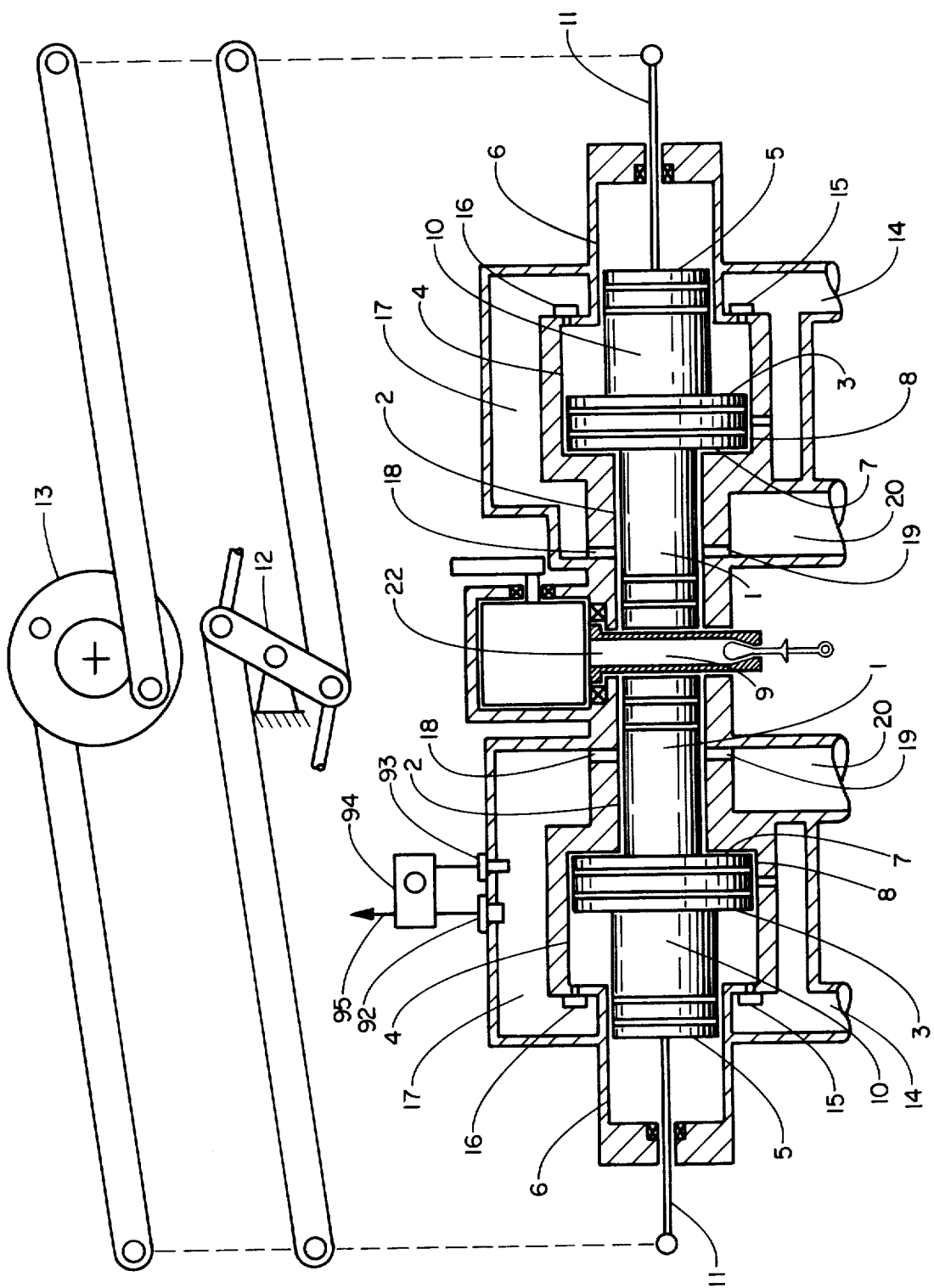

In FIG. 7 is shown a cross-section view along the power cylinder centerline of a char burning free piston gasifier showing the power pistons, 1, the air compressor pistons, 3, the bounce pistons, 5, together with two alternative types, 13, 12, of synchronizer linkage to keep the two piston assemblies in proper relative motion.

Figure 8:
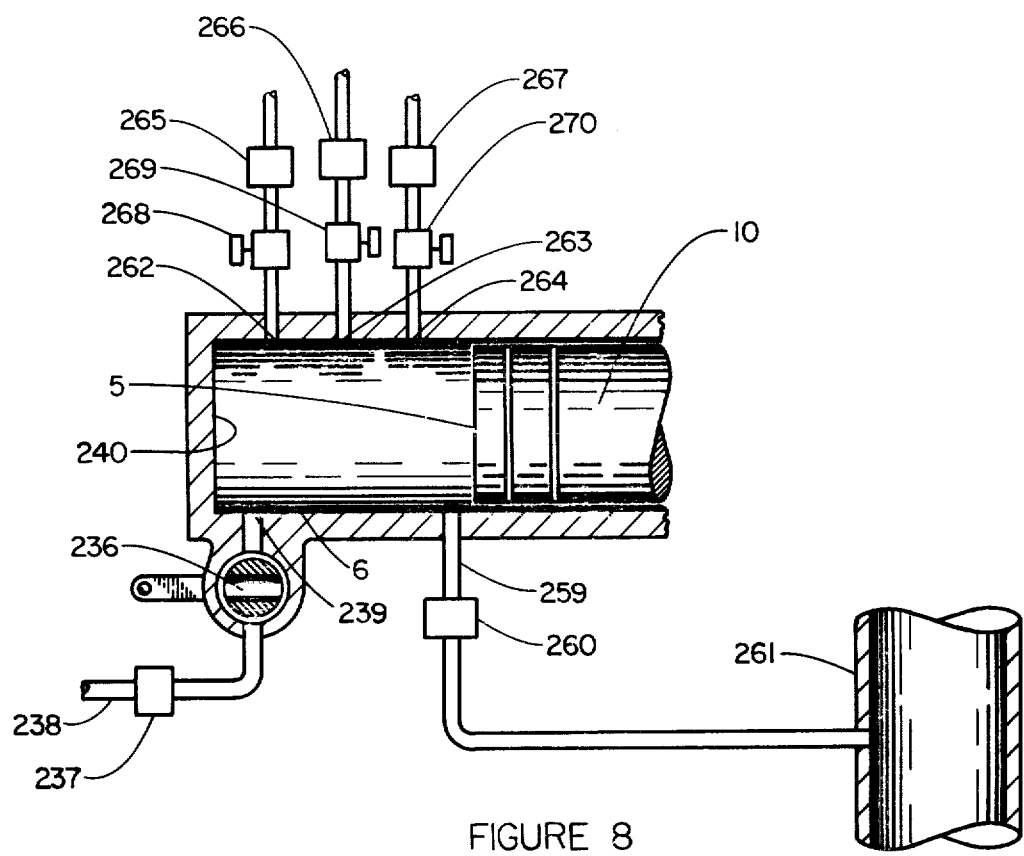

A means for controlling piston stroke length and also a means for stopping a free piston gasifier are shown in FIG. 8 as acting with the bounce piston, 5, and cylinder, 6.

Figure 9:
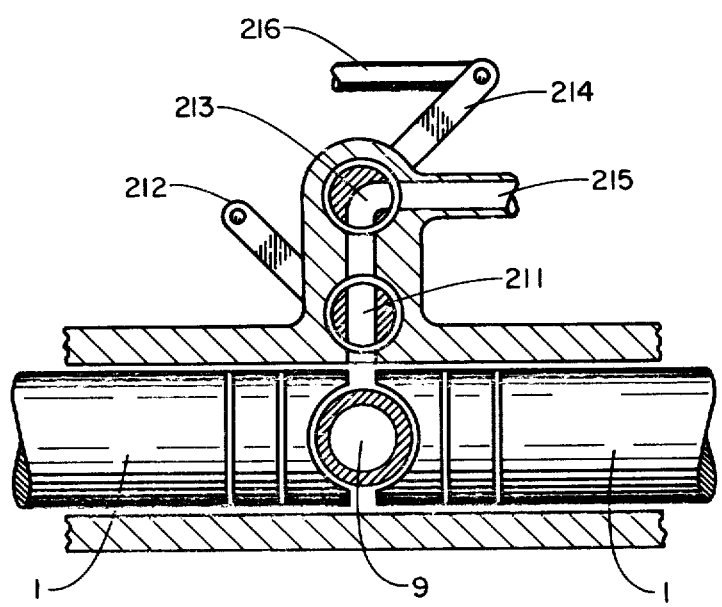

A pneumatic starting drive means is shown in FIG. 9 for acting on the power pistons, 1.

Figure 12:
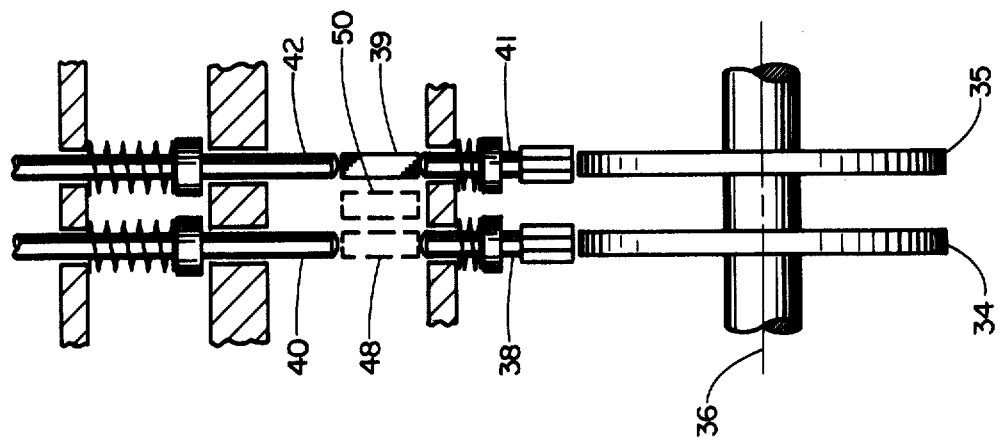
Figure 11:
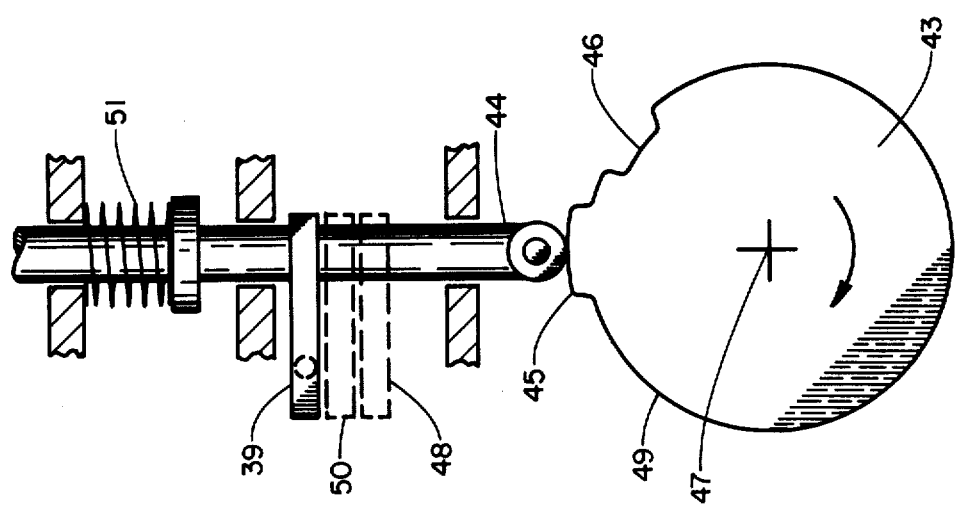
Figure 10:
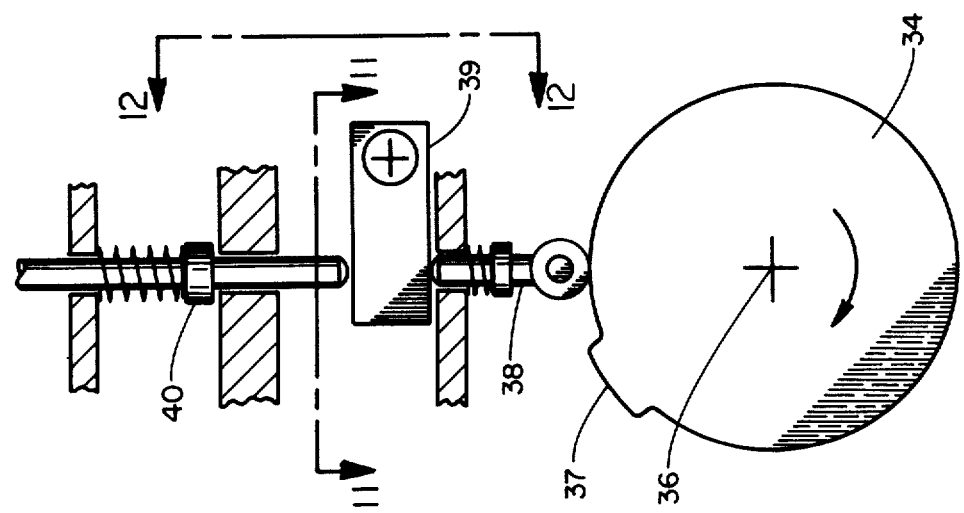

A multicycle drive means for driving refuel or ash removal or reload or moveable combustion chambers is shown in FIGS. 10, 11 and 12 with FIGS. 10 and 11 being along their respective camshaft centerlines, 36, and, 47, and FIG. 12 being across the camshaft centerline, 36.

Figure 13:
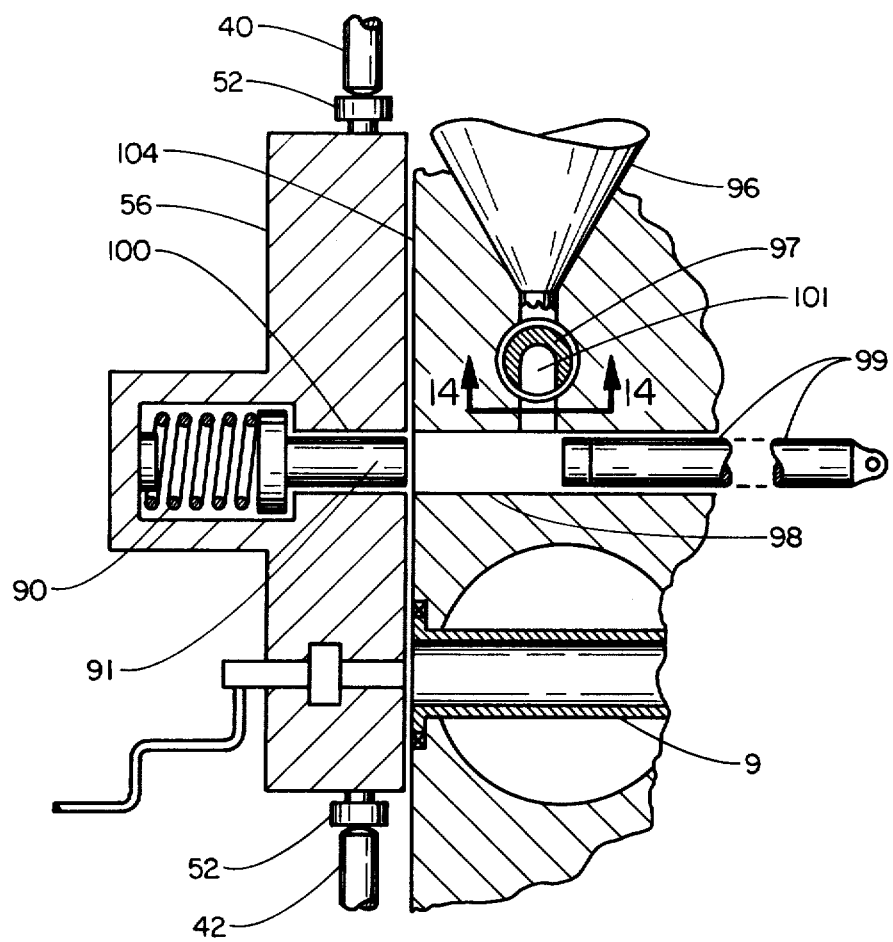
Figure 14:
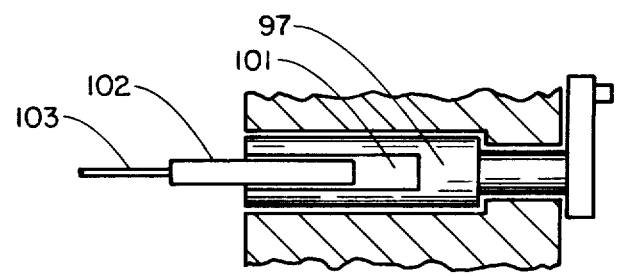

A linear motion refuel block, 56, is shown in FIG. 13, together with a positive drive reload mechanism. Details of the reload fuel quantity control means are shown in FIG. 14.

Figure 15:
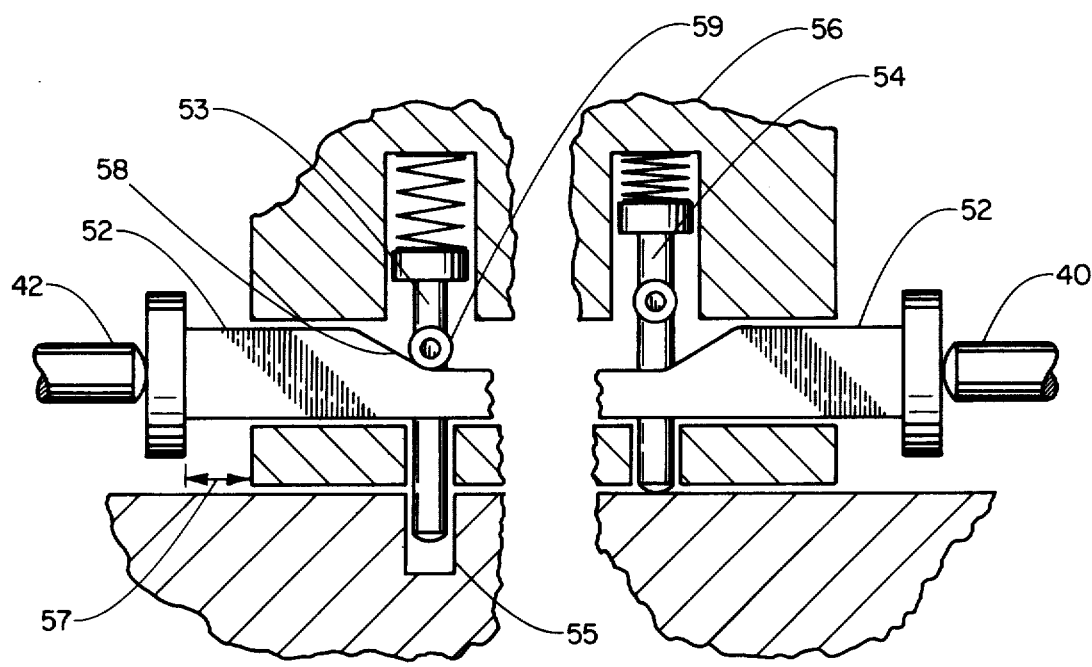

A refuel block, 56, locking scheme is shown in FIG. 15, suitable for use when a refuel block such as shown in FIG. 13 is driven by a multicycle drive means such as shown in FIGS. 10, 11 and 12.

Figure 16:
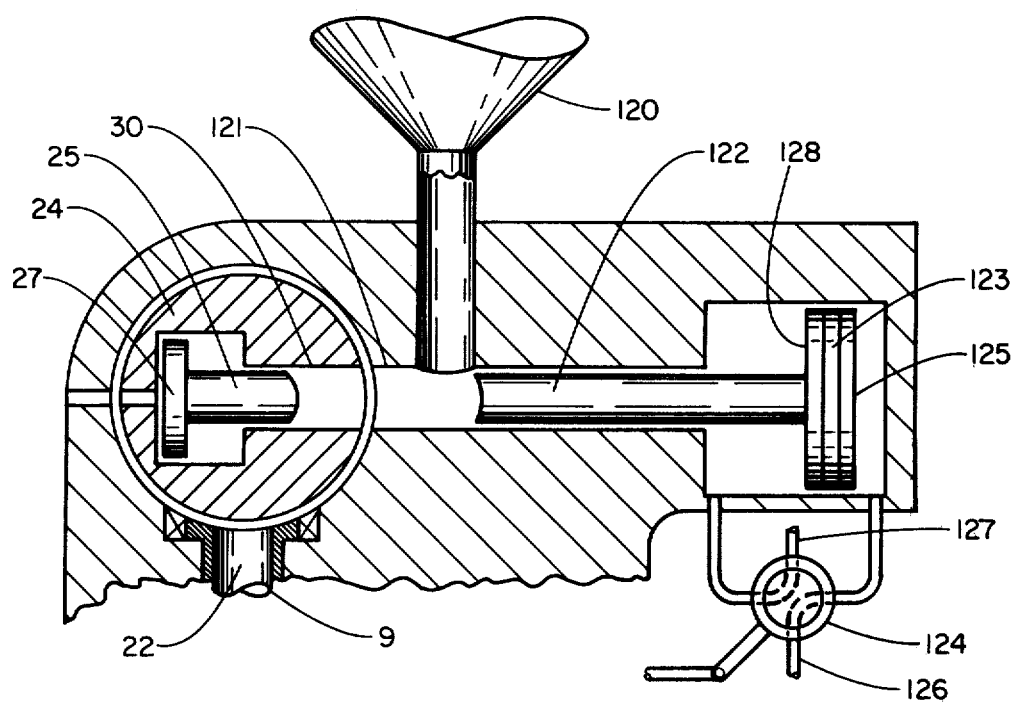

A pneumatically driven refill type of reload mechanism is shown in FIG. 16 as working with a rotary, pneumatic refuel mechanism, 24.

Figure 17:
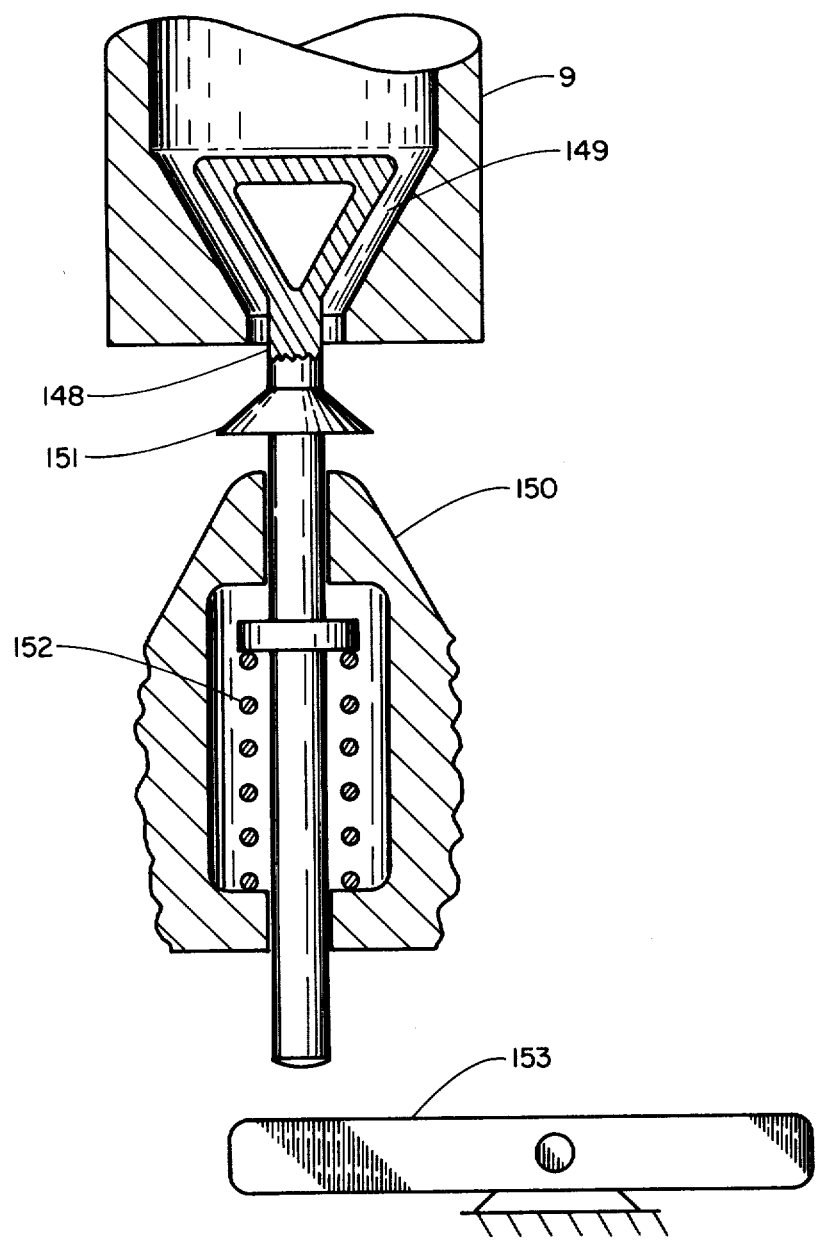

An ash removal method is shown in FIG. 17, for molten ash removal and includes an ash valve, 148, openable at shutdown by the lever, 153, for blowdown of ashes.

Figure 18:
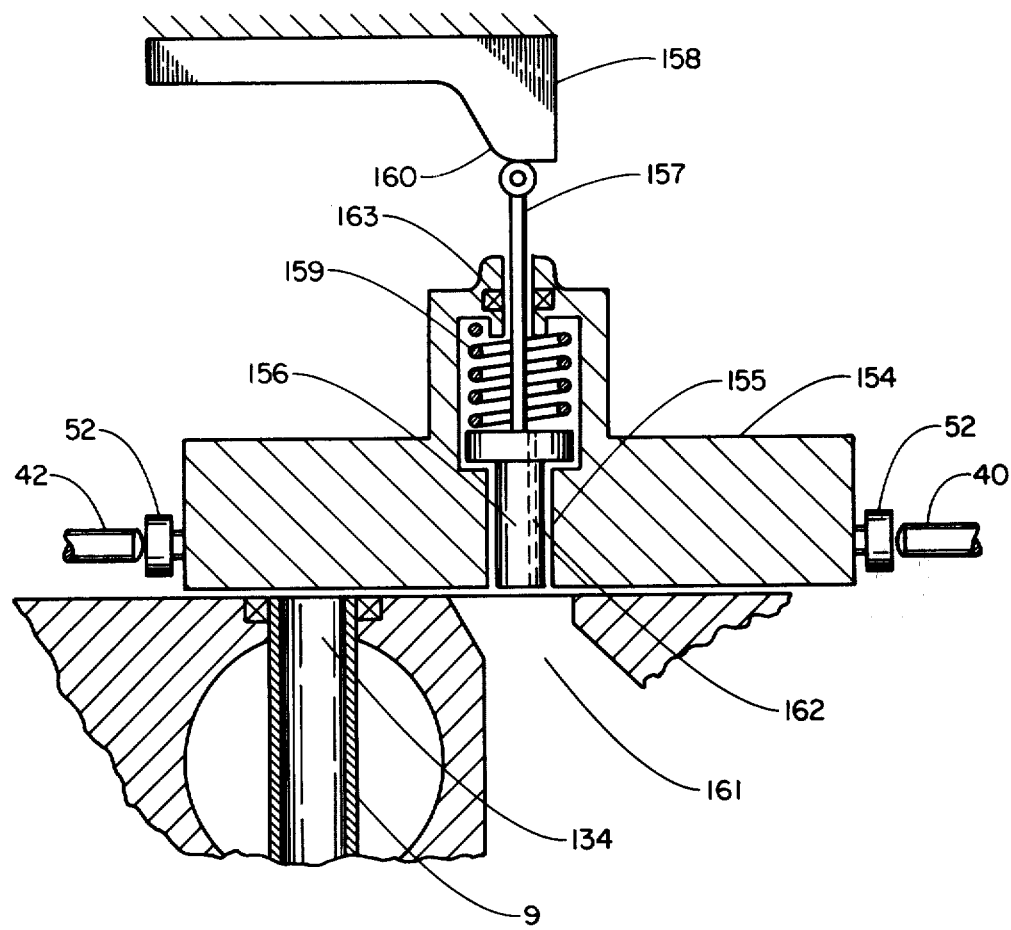

A dry ash removal mechanism with linear ash block motion is shown in FIG. 18.

Figure 19:
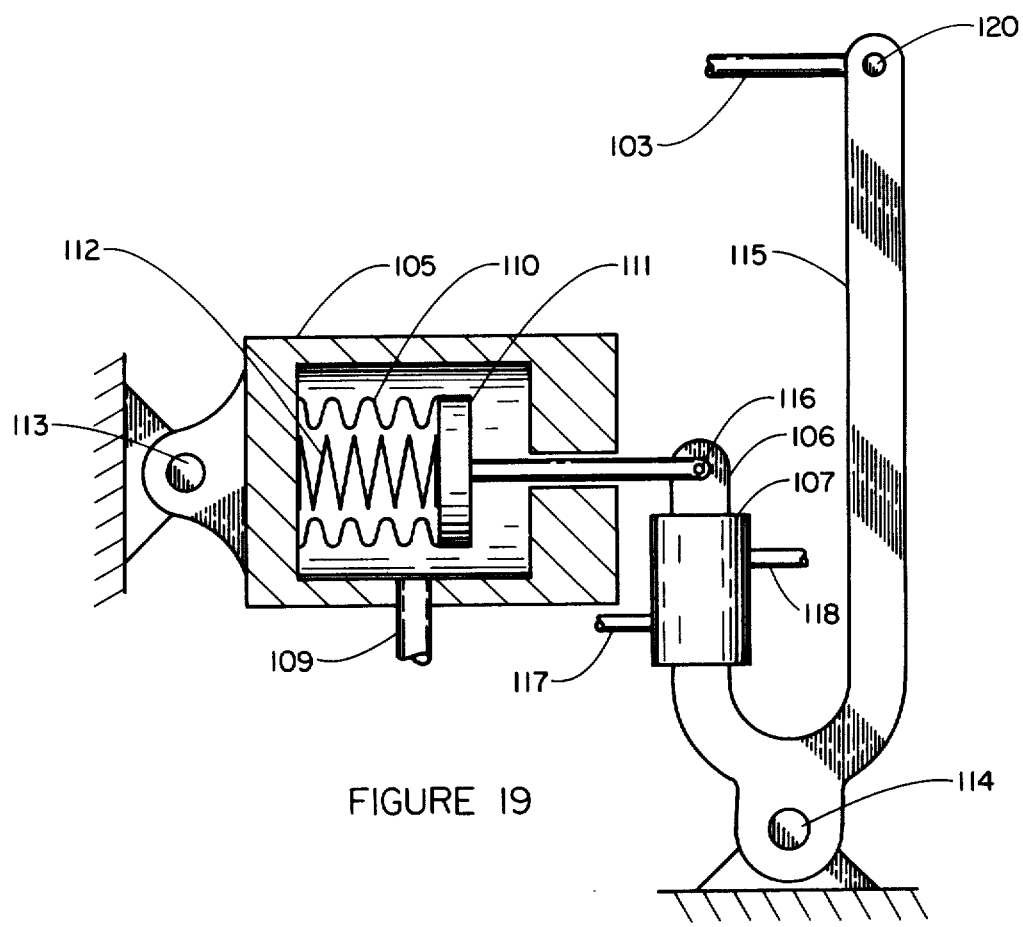
Figure 20:
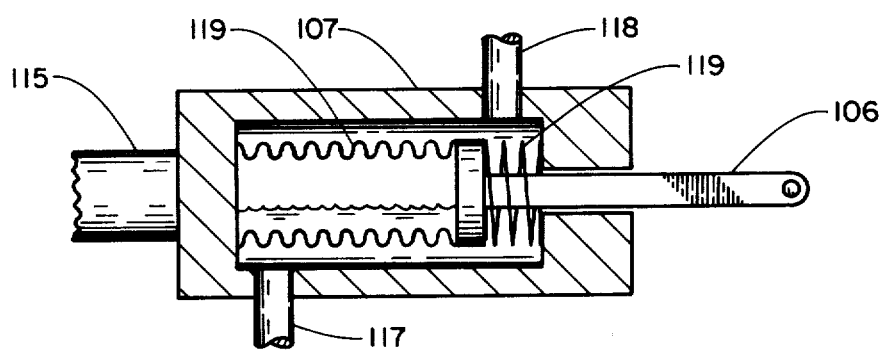

An air density sensor and control device for control of refuel quantity is shown in FIGS. 19 and 20 with the temperature sensor unit, 107, shown in greater detail in FIG. 20.

Figure 21:
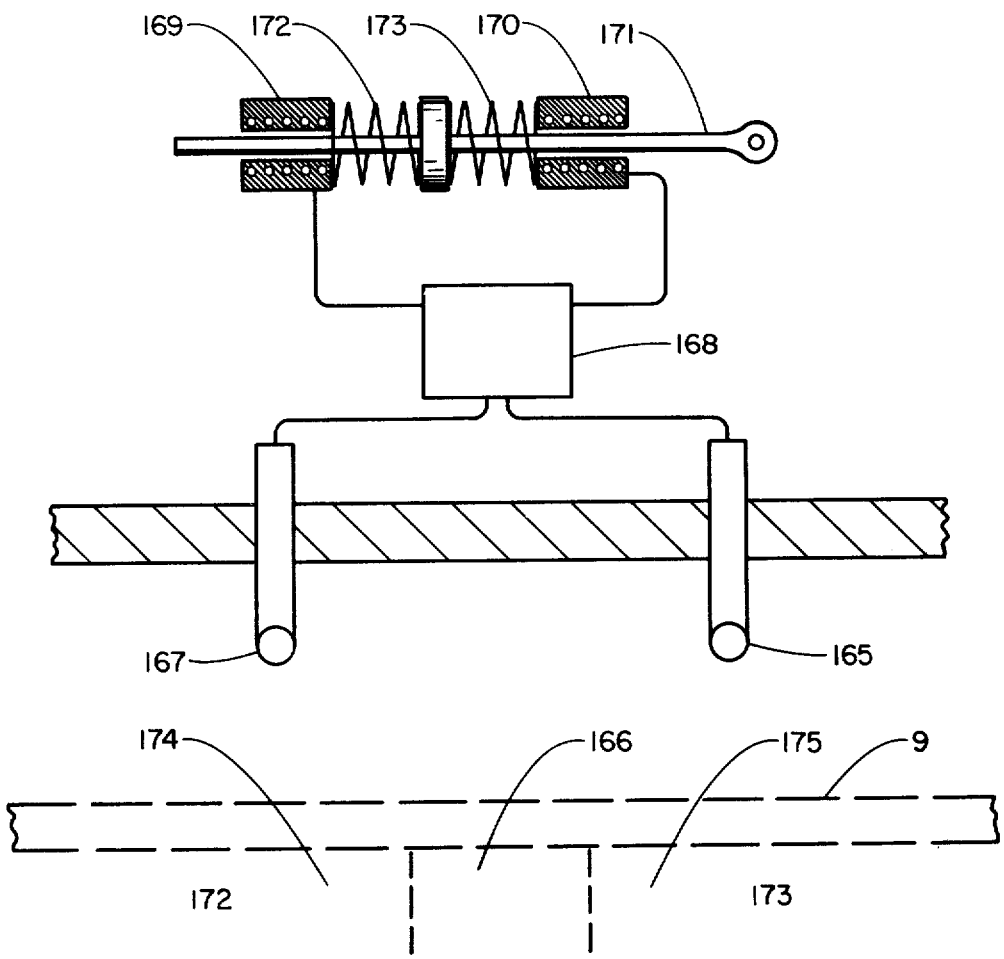

An ash level sensor and control scheme is shown in FIG. 21 for sensing the position of the ash zone, 166, in the combustion chamber, 9, and controlling refuel quantity via the solenoids, 169, 170, in order to hold the ash level at the desired position.

Figure 22:
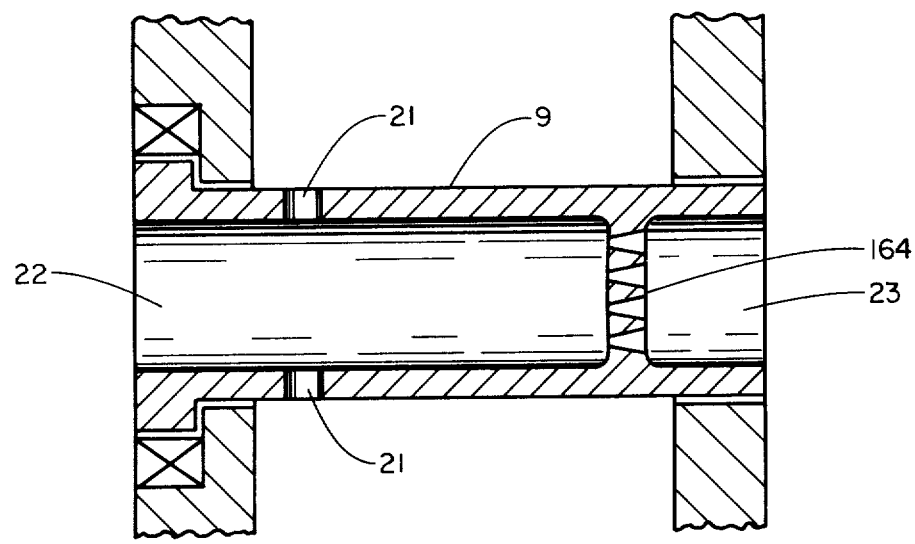

A combustion chamber, 9, with gas flow ports, 21, and a fixed grate, 164, is shown in FIG. 22.

Figure 23:
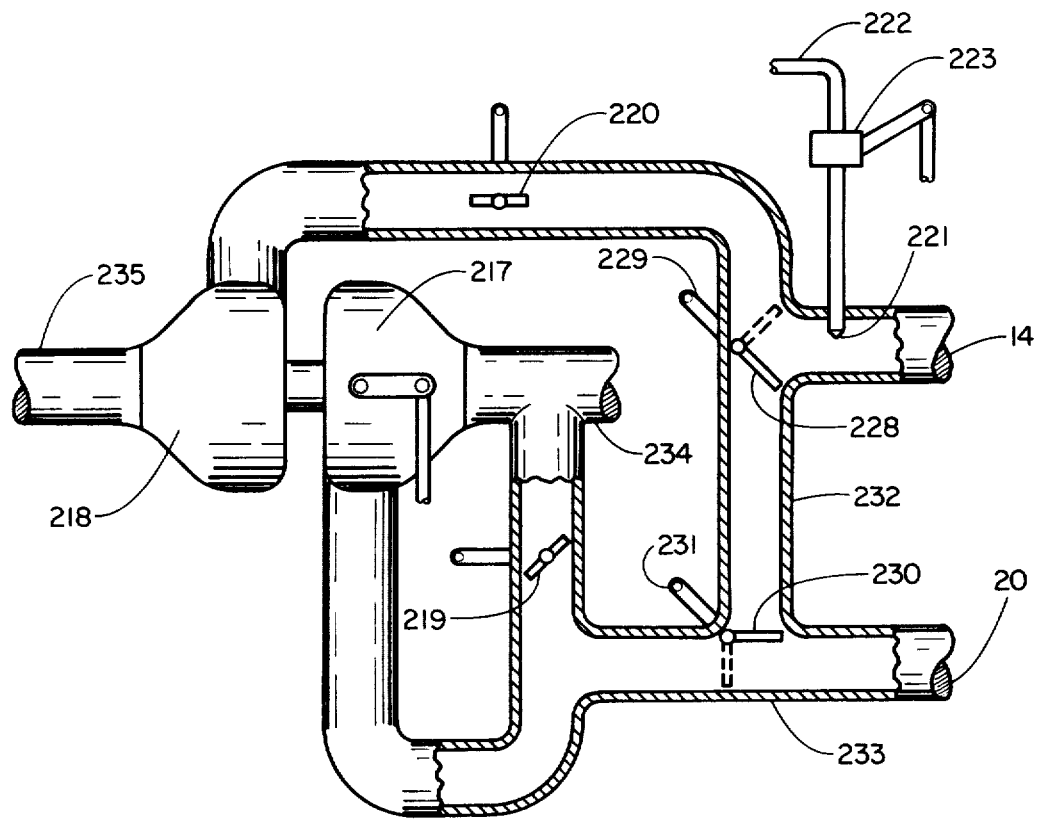

An air intake supercharger, 218, driven by an exhaust gas turbine, 217, is shown in FIG. 23, as arranged for control of air density at inlet, 14, to a free piston gasifier.

Figure 24:
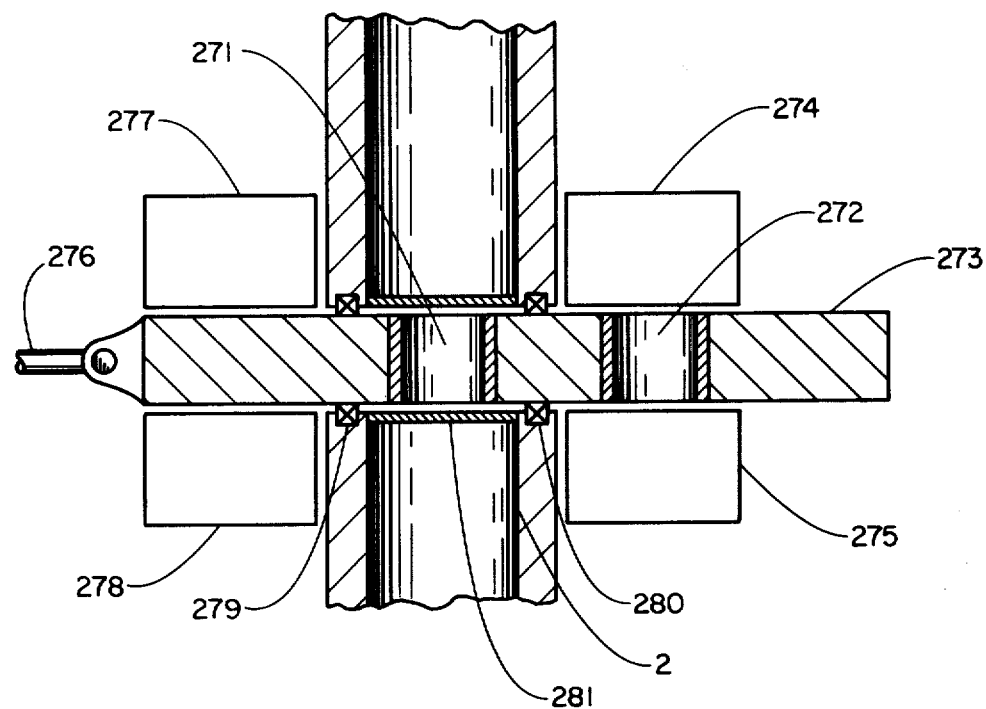

A moveable combustion chamber arrangement is shown in FIG. 24 with two combustion chambers, 271, 272, where one chamber, 271, is positioned inside the power cylinder, 2, while the other chamber, 272, is positioned outside the power cylinder for refueling and ash removal.

Figure 25:
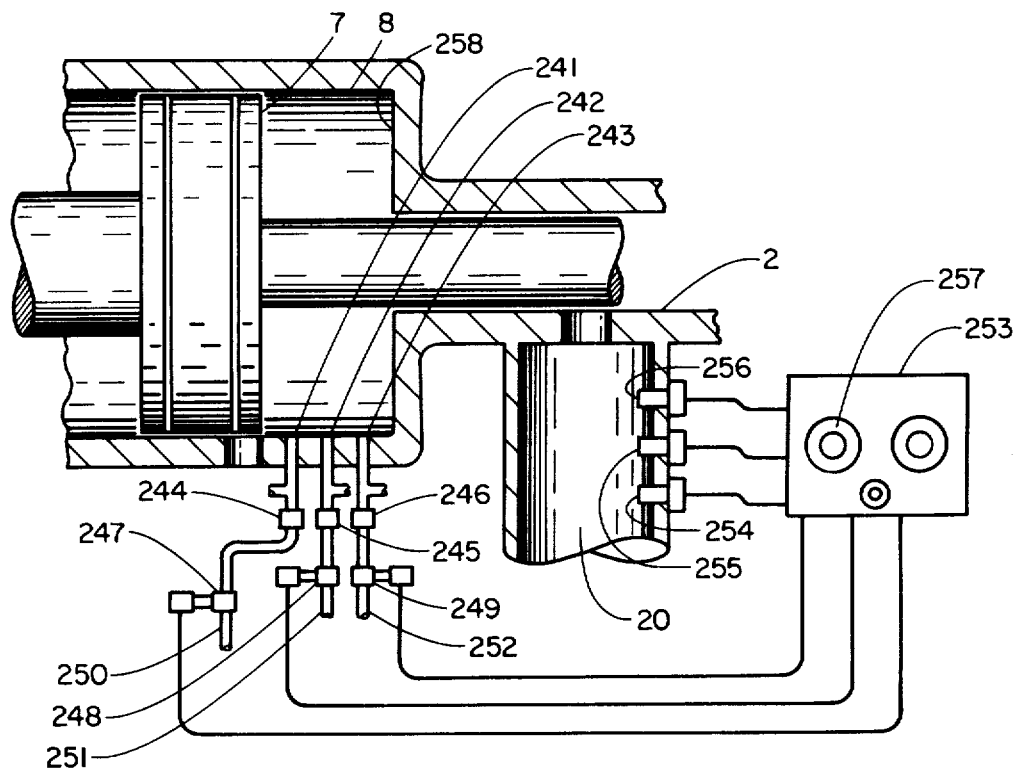

A means for controlling the oxygen distribution ratio, at power piston top dead center, as between the char pore interior and outside the char pores, is shown in FIG. 25 wherein the oxygen distribution ratio is controlled to a desired value by sensing the composition of the exhaust gas leaving the power cylinder, 2, via the exhaust pipe, 20.

Figure 26:
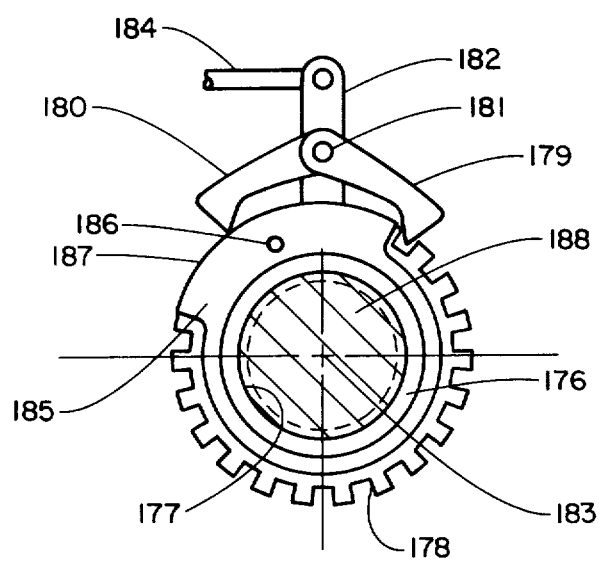

A double pawls, shielded pawls, ratchet and turnbuckle device is shown in FIG. 26 which can be used to couple an air density sensor and control, such as shown in FIGS. 19 and 20, to an ash level sensor and control, such as shown in FIG. 21, for control of refuel quantity.

DESCRIPTION OF THE PREFERRED EMBODIMENTS

The char burning free piston gas generators of this invention comprise a free piston mechanism fitted with a char fuel supply and combustion system. Rapid reaction of the char fuel is obtained since the air compressed inside the pore spaces of the solid char fuel is in very close contact with the hot char fuel. Solid char fuels usually burn only slowly in air because the gaseous products of burning blanket the char with an oxygen free atmosphere and a large distance separates the hot char from unreacted oxygen. This inert gas blanket effect is especially effective inside the pores of the char since the combustion products formed therein can escape only very slowly through the narrow pores and correspondingly new oxygen can enter inside the pores only by slow diffusion. As a result, actual burning usually takes place largely on only the external surface areas of a solid char fuel and the much larger internal pore areas are essentially unused for burning. When, however, the air is compressed into the pore volume of the solid char fuel the oxygen is mechanically forced into the pores and in consequence almost the entire internal pore area becomes available for burning. This area effect alone could increase carbon burn rate by a multiplier of about 20,000 for a char pore volume of 20 percent of the total volume, and most coal and wood char fuels are more porous than this. The char fuel is contained within a porous or ported combustion chamber made of ceramic or other high temperature material. During the compression process the power piston forces air through the ports or pores of the combustion chamber and into the pore space within the char fuel. In this way the char fuel comes into intimate contact with the oxygen in the air and rapid oxidation of the char to carbon monoxide and/or carbon dioxide occurs readily within the char pores. Since within the pores carbon is present in great excess over the oxygen the predominant oxidation product within the pores is carbon monoxide. During the following expansion process the gaseous oxidation products now flow out of the char pore space and into the volume of the power cylinder. If extra air and oxygen are available in the power cylinder volume outside the char pore space carbon monoxide can be burned to carbon dioxide by this extra oxygen. We thus see that two principal forms of this gasifier, as well as combinations of these two forms, can be constructed: a carbon monoxide or unit process gasifier wherein almost all of the air and oxygen are compressed into the char pore space to react principally to carbon monoxide; and a carbon dioxide or dual process gasifier wherein no more than half of the air and oxygen are compressed into the char pore space, the remaining oxygen being held outside to subsequently burn the emerging carbon monoxide to carbon dioxide during the expansion process. Partial dual process gasifiers can also be used wherein some, but not all, of the pore generated carbon monoxide is burned to carbon dioxide during power piston expansion, the remaining carbon monoxide being burned subsequently elsewhere, as, for example, in the combustion chamber of a following gas turbine engine.

A unit process gasifier can produce a fuel gas at high pressure as its useful output and this is one of the beneficial objects of this invention which prior art free piston gasifiers could not efficiently achieve. A unit process or a partial dual process gasifier can exhaust into a gas turbine engine which, in turn, can exhaust into a steam boiler furnace wherein the remaining carbon monoxide is burned to carbon dioxide to aid in generating steam for use in a steam turbine engine. This latter triple cycle scheme provides a method for efficiently burning coal and other char fuels in gas turbine-steam turbine combined cycle power plants, which heretofore have only been able to use expensive oil or gas fuels due to gas turbine blade problems with ash when coal was used.

A dual process gasifier can be used as a source of compressed air energized with low cost char fuels instead of expensive liquid or gaseous fuels and complete and efficient burning of the char fuel can be obtained.

The above are only a few illustrative examples of the various ways in which the char burning free piston gas generators of this invention can be used to advantage.

The actual rate of burning of the char as well as the cycle timing of this burning will be determined by the rate of forcing oxygen into the char pores. Once oxygen has been forced inside the char pores it will react very quickly with the adjacent hot carbon to form principally carbon monoxide. The rate of oxygen transfer into the pores and hence the rate of burning is determined by the power piston motion during compression and also the temperature rise of the gas inside the pores due to burning therein. An approximate calculation of these piston motion and reaction heating effects shows that almost no reaction occurs until the last 12 percent of the compression stroke and that 80% of the char burning reaction occurs during the last 6 percent of the compression stroke at an almost steady rate. This distribution of the burning reaction is essentially independent of gasifier cycle speed except as gas flow pressure drop in the char pores becomes excessive at very high speeds. Hence the char burning occurs principally at or near power piston top dead center on the compression stroke as desired for high efficiency.

For a unit process gasifier, which burns the carbon largely to carbon monoxide, practically all of the air in the power cylinder is forced into the char pore space. For a dual process gasifier the carbon monoxide formed inside the pores is to be burned further to carbon dioxide during the expansion stroke. For this dual process gasifier at least half of the air in the power cylinder is not forced into the char pores and hence is available to burn the carbon monoxide as it emerges from the pores during expansion. We define here a pore volume ratio, RP, as the ratio of the char pore volume to the total gas space volume in the power cylinder when the power piston is at top dead center. Thus for a unit process gasifier RP has a value near one. For a dual process gasifier RP has a value of no more than about 0.75 to 0.80 depending upon the extent of gas cooling to the cylinder walls and the reaction heating of the pore gas. Running values of RP for a dual process gasifier are best determined experimentally at minimum exhaust gas content of carbon monoxide.

Necessarily for unit process gasifiers the entire burning process takes place prior to the end of the compression stroke. For dual process gasifiers, the burning reaction to carbon monoxide occurs prior to the end of the compression stroke, and the further burning reaction to carbon dioxide occurs after the end of the compression stroke and during the early portions of the expansion stroke.

Gasifiers may also be designed wherein some, but not all, of the carbon monoxide emerging from the char pores is burned to carbon dioxide inside the gasifier and for these gasifiers an RP value between 1.0 and the value for dual process can be used. For these partial dual process gasifiers, the remaining carbon monxide may be subsequently burned to carbon dioxide in other apparatus outside the gasifier.

Dual process gasifiers may also be designed wherein the amount of air retained outside of the char pore volume is well in excess of that needed to burn the emerging carbon monoxide to carbon dioxide. This excess outside air form of the invention could be used with those char fuels which evolve appreciable quantities of volatile matter, in addition to the carbon monoxide, and the excess outside air is needed for the efficient burning of this volatile matter. Raw bituminous coal, coal char soaked with oil fuel, or inert ceramic pellets soaked with oil fuels are examples of high volatile matter fuels for which this excess outside air form of the dual process gasifier would usually be preferred.

A. Char Fuels:

The term "char fuels" is used hereinafter and in the claims to mean any fuel, capable of reacting chemically with oxygen to release chemical energy, whose usual physical state is wholly or largely solid or which leaves behind a solid residue after volatile matter has been evolved. Included within this definition of char fuel are such common and well-known fuels as coal, coke, charcoal, coal char, petroleum char, wood, lignite, peat, petroleum coke, certain residual petroleum fuels, etc. Certain of these fuels, such as wood and certain types of coal, are known to evolve gaseous and liquid fuel components when heated and these evolved gaseous and liquid fuel components are hereinafter referred to as "volatile matter." All of the above defined char fuels are either already solid or leave behind a solid, largely carbonaceous, residue after the volatile matter has been evolved and this solid residue is hereinafter referred to as "fixed carbon." Many of the above defined char fuels are also known to contain ash-forming ingredients which leave behind a non-burnable residue after the fuel has been burned with oxygen and this non-burnable residue is hereinafter and in the claims referred to as the "ash." Oil-soaked char fuels and oil-soaked inert pellets can also be used as char fuels. Preferred oils for these applications are residual type materials, heavy tars, asphalts, and slurries of oil and solid char materials as they will yield appreciable fixed carbon when burning commences in the combustion chamber. Solid char fuels of high porosity and similar to the above-described coal char fuel can also be manufactured by the devolitalization of wood waste materials, tree bark, agricultural waste materials, garbage, and other vegetable and organic materials. Most of these vegetable-derived fuels are a renewable energy resource.

B. Elements:

The basic elements of this invention comprise: a free piston mechanism; a combustion chamber wherein char fuel burns with air so that the combustion energy can drive the free piston mechanism; a refuel mechanism to replace char fuel burned up in the combustion chamber; and a reload mechanism to put fresh makeup char fuel into the refuel mechanism for the next refueling. All forms of this invention must contain these basic elements, and for some uses of this invention additional elements may be preferred. Where ash-forming char fuels are to be burned, it will be highly preferred to add an ash removal mechanism to remove ashes from the combustion chamber. A means for starting the free piston gasifier can be added, which drives the free piston mechanism and concurrently heats up the char fuel inside the combustion chamber to its self-burning temperature. The quantity of useful output gas generated by a free piston gasifier can be controlled by a means for controlling the density of the air supplied to the free piston gas generator, as by supercharging or throttling. Various means can be added for stopping a free piston gas generator such as bleeding gas out of the bounce cylinders and/or slowing down the burning reaction of the char. The heating value of the fuel gas generated by a free piston gas generator can be increased by adding on a means for admitting steam into the power cylinder so that this steam can also react with char fuel in the combustion chamber. Where oil fuels are to be used for starting or for running with or without char fuels, a means can be added for placing the oil fuel upon char fuel or upon inert material. Preferably the oil fuel is so placed just prior to or during refueling of the char fuel or inert material into the combustion chamber so that the next following compression process will force the oil deeply into the pore spaces of these solid materials. Where the free piston gas generator is to be used as a source of high pressure fuel gas, the desired unit process operation can be secured by adding a means for controlling the oxygen distribution ratio, as between placement inside the char pore spaces and retention outside the combustion chamber. In some applications a means for controlling the length of stroke of the pistons of the free piston mechanism may be added in order to assure proper scavenging of the power cylinder or to maintain the compression ratio within certain limits. Various other elements may also be added such as control elements to assure efficient utilization of both the char fuel and the oxygen while within the combustion chamber.

Details of these basic elements and of these added elements will now be described together with a description of various forms and modifications of these elements.

B1. Free Piston Mechanism:

One particular example form of a free piston mechanism is shown partially in FIG. 7 and comprises the power pistons, 1, reciprocating inside the power cylinders, 2, the air compressor pistons, 3, reciprocating inside the air compressor cylinders, 4, the bounce pistons, 5, reciprocating inside the bounce cylinders, 6, the reverse bounce pistons, 7, which work inside the reverse bounce cylinders, 8. Commonly a power piston, 1, an air compressor piston, 3, a bounce piston, 5, and a reverse bounce piston, 7, are assembled, as shown in FIG. 7, into a single piece, 10, and two such piston pieces are arranged symmetrically opposite to each other about the combustion chamber, 9. The two piston assembly pieces, 10, are sometimes connected, as via the piston rods, 11, to a symchronizer linkage assembly, 12, this connection being indicated by the dashed lines in FIG. 7 to avoid undue complexity of the drawing. The synchronizer linkage, 12, serves to assure that both piston assembly pieces, 10, move symmetrically oppositely to one another as desired for balance of inertia forces. The synchronizer linkage, 12, moves back and forth and each link thereof reciprocates in two directions and hence the length of stroke of the pistons pieces, 10, can vary as can also the compression ratio within the power cylinders, 2, and the bounce cylinders, 6. The crank and connecting rod synchronizer linkage, 13, can be substituted for the reciprocating synchronizer linkage, 12, if desired, and if the cranks move unidirectionally, the stroke lengths and compression ratios of the piston pieces, 10, do not vary and are constant. Several separate piston and cylinder assemblies, such as the single assembly shown in FIG. 7, can be coupled together via a common crankshaft when this unidirectional crank and connecting rod synchronizer linkage, 13, is used, although this has not been the practice. The term top dead center refers to the position of closest approach of the two piston assembly pieces, 10, and the term bottom dead center refers to their position of greatest separation. Note that the expansion stroke of the power pistons, 1, when the piston assemblies, 10, are moving away from each other, is the same as the compression stroke of the air compression pistons, 3, and the compression stroke of the bounce pistons, 5, and these compressions and expansions are exchanged on the reverse stroke when the piston assemblies, 10, are moving toward each other. Other arrangements of the free pistons and cylinders and of the synchronizer linkage are also well known in the art and the foregoing serves only as a typical example.

The term "free piston mechanism" is used herein and in the claims to mean these several pistons and cylinders and linkages as described above and additionally comprises such additional elements as cooling systems, lubrication systems, piston rings, seals, etc. as necessary or desirable for the efficient operation of the free piston mechanism when used within a free piston gas generator, and as are already well known in the art of free piston gas generators.

The operation of a free piston gas generator using the free piston mechanism of FIG. 7 can be explained by following the air and then the combustion gases on their path through the mechanism. Fresh air is supplied at gasifier intake density to the gasifier intake, 14, and is then drawn into the air compressor cylinder, 4, via the air suction valve, 15. After being compressed by the air compressor piston, 3, the air is discharged via the delivery valve, 16, into the compressed air reservoir, 17. Following expansion and exhaust of the power piston, 1, compressed air from the reservoir, 17, flows at power piston intake density into the power cylinder, 2, via the power piston intake ports, 18, and this air is then compressed on the next stroke of the power pistons, 1. Combustion of fuel and oxygen in the combustion chamber, 9, increases the temperature and pressure of the gases with the result that the work of the next following expansion exceeds that of the just preceding compression and this excess work is utilized to accomplish the air compression done by the piston, 3. After expansion of the power piston, 1, the combustion gases discharge via the power piston exhaust ports, 19, into the product exhaust gas pipe, 20. The scavenging process of removing most of the exhaust gas from the power cylinder, 2, and replacing it with compressed air from the reservoir, 17, can be accomplished by having the pressure in the exhaust pipe, 20, somewhat lower than the pressure in the reservoir, 17, and/or by design of the intake ports, 18, and the exhaust ports, 19, to utilize local pressure reductions inside the power cylinders, 2, resulting from gas flow inertia effects of both the exhaust gas and the compressed air. Scavenging processes must be completed while the pistons are moving into and past the bottom dead center position between the time when the power piston, 1, first uncovers the exhaust port, 19, during the expansion stroke and the time when the power piston, 1, next covers the intake port, 18, or the exhaust port, 19, whichever is later during the next following compression stroke. The gas in the bounce cylinders, 6, in being alternately compressed and expanded by the bounce pistons, serves to store up sufficient energy during its compression as to be able to force the power piston back through its compression process when the bounce cylinder gases expand. The reverse bounce pistons, 7, and cylinders, 8, additionally restrain the return compression stroke of the power pistons, 1, and can be arranged to secure the desired geometry of the combustion space at top dead center. All pistons, 1, 3, 5, 7 have the same total stroke length, 1. The volumetric compression ratio, PCR, of the power pistons, 1, need not be the same as the volumetric compression ratio, BCR, of the bounce pistons, 5.

The net cycle work of the power pistons, 1, equal to the excess of expansion work over compression work, is approximately equal to the net work of the air compressor piston, 3. The expansion work of the bounce pistons, 5, is approximately equal to the compression work of the power pistons, 1, for the free piston mechanism of FIG. 7. Hence the ratio of bounce piston area, ABP, to power piston area, AP, is approximately:

$$(ABP/AP) = (PC/PBO)(PCR/BCR)(BCR - 1/PCR - 1)(PCR^{K-1} - 1/BCR^{K-1} - 1)$$

Wherein PC is the compressed air pressure in the reservoir, 17, PBO is the lowest gas pressure in the bounce cylinder, 6, and K is the specific heat ratio for the appropriate gases. The air delivered by the air compressor pistons, 3, into the reservoir, 17, either subsequently enters the power cylinders, 2, or is bled off as a useful compressed air product for some external use. We define an air use ratio, au, as the ratio of the air mass delivered into the power cylinders to the total air mass compressed by the air compressor piston. Note that au has a maximum value of one when no air is bled off for external use. On this basis the ratio of air compressor piston area, AAC, to power piston area, AP, is approximately:

$$(AAC/AP) = (PC/PO)^{1/k}(eve/evp)1/au$$

Wherein PO is the pressure of the air supplied at the gasifier intake, 14, eve is the volumetric efficiency of the power piston and cylinder, and evp is the volumetric efficiency of the air compressor piston and cylinder.

The term free piston mechanism cycle is used herein and in the claims to mean the sequence, starting from top dead center, of: expansion process of combustion gases in the power cylinder, 2, as power pistons, 1, move away from each other; exhaust of combustion gases from the power cylinders, 2, via the exhaust ports, 19; intake of compressed air into the power cylinders, 2, via the intake ports, 18, from the reservoir, 17; compression process of air in the power cylinders, 2, as power pistons, 1, move toward each other to return to the top dead center. The term free piston mechanism cycle includes the above cycle of events of the power piston together with the concurrent events of the other pistons and portions of the free piston mechanism.

B2. Combustion Chamber:

The combustion chamber, 9, as shown in FIG. 7 and in more detail in FIG. 22, constitutes a means for containing the char fuel and ashes separated mechanically from the power piston, 1, and cylinder, 2, and providing ready flow of air from the power cylinder, 2, into the pores of the char fuel during compression and further providing ready flow of gases from the pores of the char fuel into the power cylinder during expansion. Since the walls of the combustion chamber are in close contact with the burning char, a high temperature material is preferred, such as a porous ceramic material with the ceramic pores providing the gas flow passages. Cooling of the combustion chamber walls can occur partly by heat transfer into the gasifier cooling jacket via the combustion chamber mountings and partly by heat capacitor cooling to the air charge flowing from the power cylinder into the char fuel during compression. Such heat capacitor type cooling is common in prior art internal combustion engines as, for example, the ceramic insulators on gasoline engine spark plugs. Improved heat capacitor cooling of the combustion chamber can be secured by increasing the thickness of the chamber walls. Improved heat transfer cooling of the combustion chamber via the mountings thereof can be achieved by using chambers of a shorter length and larger cross-sectional area. A water or air cooled, metal, combustion chamber with ceramic covering can also be used, but is complex and costly to build. Where a porous ceramic combustion chamber is used and the ceramic pores are the gas flow passages, the maximum useable gasifier cycles per minutes (cpm) may be determined by the gas flow pressure drop across these ceramic pores. Too greatly a flow pressure drop will reduce efficiency and eventually will seriously reduce the amount of oxygen actually reaching the char pores. Where higher cycle speeds are to be used, the ceramic porosity and pore size can be increased but only up to a pore size which starts to allow ashes to escape from the combustion chamber. For still higher speeds, gas flow ports, 21, can be placed through the combustion chamber walls to provide adequate gas flow area. Such gas flow ports are preferably placed toward that refuel end, 22, of the combustion chamber, through which refueling occurs, so that ashes cannot escape thereby, and are preferably used with briquetted or pelletized fuel or fuel contained in cannisters, so that fuel cannot escape thereby. Where such gas flow ports are used they are preferably arranged to distribute air inflow during compression around and along the char fuel mass and for dual process gasifiers to direct the pore gas outflow during expansion for good mixing with the unreacted air in the clear space of the power cylinder. Combustion chambers with gas flow ports can also have ceramic pores which can assist in proper distribution of the air inflow during compression. These gas flow ports, when positioned near the refuel end, 22, of the combustion chamber, can also aid in the clean burning of char fuels containing volatile matter, such as raw coal. As the volatile matter is being distilled out of the fresh fuel near the refuel end, it is important to mix air promptly into the volatile matter vapors to assure their clean, sootless burning and the gas flow ports can be arranged to do this by placing them toward the refuel end of the combustion chamber.

Just as gas flow pressure drop through the ceramic pores of the combustion chamber wall can limit maximum useable cycle speed, so also can gas flow pressure drop into and out of the char fuel. Additionally, the central portions of a chunk of char fuel will burn only slowly since incoming oxygen will be captured first by the carbon in the outer portions of the char pores. These twin problems of char pore pressure drop and unequal char burnup can be minimized for higher speed gasifiers by proper arrangements of the char fuel mass within the combustion chamber. Crushed fuel and pelletized fuel will shorten the average char pore length and also provide interstitial flow passages between separate pellets and chunks, thus reducing char pore pressure drop and also distributing oxygen more nearly uniformly throughout the char mass. Where combustion chamber wall ports are also used, the crushed fuel and the pelletized fuel can additionally be briquetted. Gas flow passages, such as radial grooves, can be made into the char fuel briquettes to further reduce gas flow pressure drop therein and to more nearly equally distribute the incoming oxygen. If the char fuel is placed within containers or cannisters, these latter can be provided with gas flow passages to reduce gas flow pressure drop and to more nearly equally distribute the incoming oxygen. Reduced char pore pressure drop and improved oxygen distribution can also be achieved by use of longer combustion chambers with smaller cross-sectional area, but combustion chamber wall cooling problems will be aggravated as discussed previously.

Some char fuel fragments can perhaps survive into the ashes and become especially difficult to burn if encapsulated in ash materials. To aid in burning up these final char fragments, the ash level can be kept reasonably deep in the combustion chamber so that oxygen can reach these fragments through the ashes.

The combustion chamber is fastened into the power cylinder so as to allow for the difference in thermal expansion between the very hot combustion chamber and the relatively cold cylinder. Other than those possible thermal expansion stresses, the combustion chamber is not stressed except slightly by the gas flow pressure drop. The combustion chamber fastenings need not be a gas tight seal but only a fuel and ash tight seal. These fastenings also serve as a heat transfer passage for cooling of the combustion chamber walls. Various types of fastenings can be used to fulfill these requirements. For example, flexible tubular metal sealing rings can be used at each end of the combustion chamber, with the refuel end, 22, axially secured and that ash removal end, 23, through which ashes are removed, axially free to expand.

The space available for char fuel within the combustion chamber, 9, needs to be sufficient to provide the required pore volume, VP, so that the desired power cylinder compression ratio, PCR, is obrained. This char fuel volume, VCH, is given in terms of power cylinder displacement volume, VD, by the following relations:

$$\frac{VCH}{VD} = \frac{100\,RP}{(\%\ Pore)\,(PCR - 1)}$$

wherein % Pore is the volume percent pore space within the char volume, VCH. For average char materials the char weight, WC, relative to the weight of air per cycle, Wa, is given by the following relation:

$$\frac{WC}{Wa} = \frac{100\,RP(138)[1 - (\%\ Pore/100)]}{(\%\ Pore)(PCR - 1)(da)}$$

wherein da is the intake air density in pounds per cubic foot at the intake ports of the power cylinder, and the 138 is the average carbon density, without pores, also in pounds per cubic foot.

We define here an oxygen distribution ratio, G, as the ratio is oxygen placed within the char pores to the total oxygen supplied per cycle. Thus for a unit process gasifier G has a value of one and for a dual process gasifier G has a value of no more than about one half. The relation between the oxygen distribution ratio, G, and the pore volume ratio, RP, is as follows:

$$\frac{G}{1-G} = \frac{RP}{1-RP}\left(\frac{T}{TP}\right)\frac{1}{1.21}$$

wherein the ratio, T/TP, is the ratio of gas temperature outside the pores, T, to gas temperature inside the pores, TP, with the power piston at top dead center at the end of the compression stroke. Note that at the limiting case for RP of one, G also has a value of one.

As the gasifier runs on this char fuel is being consumed and must be replaced at intervals of N cycles. Between char replacement intervals char burn down increases the volume and reduces the compression ratio. Hence the refuel interval, N, in cycles is related to the allowable decrease of power cylinder compression ratio, CCR, by the following approximate relation:

$$\frac{CCR}{(PCR-1)} = \frac{0.175(da)(G)(PCR-1)}{[138 + 0.175(da)(G)(PCR-1)]}$$

$$N = \frac{138(CCR)}{0.175(da)(G)(PCR-1)(PCR-1-CCR)}$$

The amount of replacement char fuel to be put into the combustion chamber at each refueling, rwc, in pounds, is given by the following approximate relation:

$$rwc = 0.175(da)(G)(N)(VD); \qquad \text{Eqn. F}$$

Note that essentially only the oxygen placed within the char pores is available to react with the char fuel. That oxygen retained outside the char volume is useable to burn emerging carbon monoxide but is not available to burn directly the char fuel. It is the task of the refuel mechanism to place the refuel quantity, rwc, of fresh char fuel into the combustion chamber, 9, at each refuel interval of N cycles.

Figure 1:
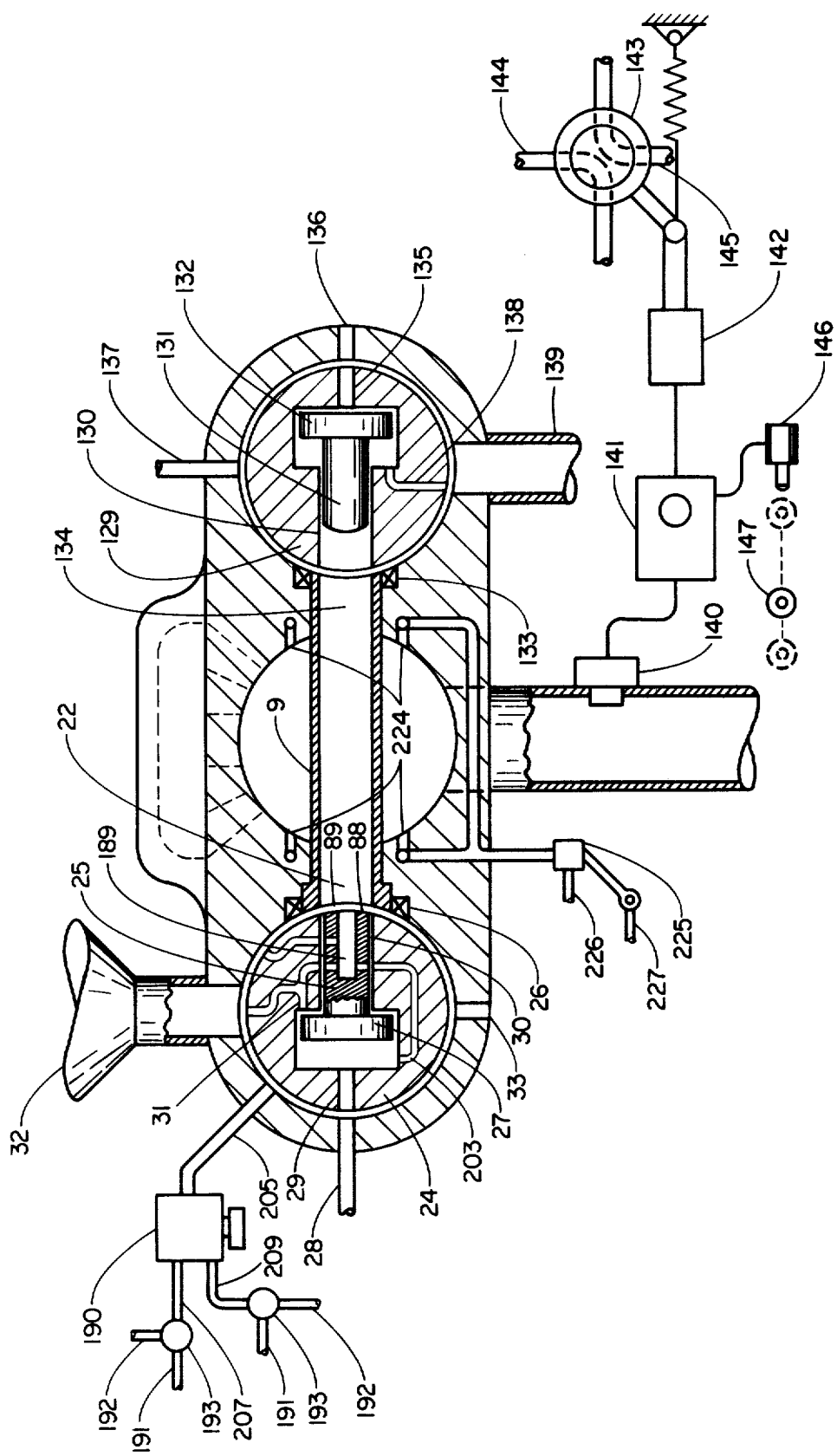
In FIG. 1 is shown a cross section through the combustion chamber 9, across the power cylinder centerline, of a char burning free piston gasifier, showing one scheme for refueling, for reloading and for ash removal.

B3. Refuel Mechanism:

Various kinds of refuel mechanism can be used as a means for adding fresh char fuel at intervals into the refuel end of the combustion chamber and all of them should also provide a means for sealing the refuel end of the combustion chamber against gas leakage during compression and expansion. One example of a refuel mechanism is shown partially in FIG. 1 and comprises a rotary refuel block, 24, a pneumatically actuated refuel piston, 25, acting inside the refuel cylinder, 30, and a gas sealing means, 26, the drive means for the refuel block not being shown in FIG. 1. Refueling is accomplished by rotating the refuel block, 24, to align the refuel piston, 25, with the refuel end, 22, of the combustion chamber, 9, and then driving the refuel piston, 25, by the refuel drive piston, 27, which is acted upon by pneumatic pressure via the passage, 28, and the drive port, 29, so that char fuel in the refuel cylinder, 30, is forced into the combustion chamber, 9. The back side of the refuel drive piston, 27, is vented to low pressure via the passage, 31. Any source of compressed gas can be used for this pneumatic drive but a preferred source is the compressed air in the reservoir, 17. After refueling the refuel block, 24, is rotated 90 degrees to align the refuel piston, 25, with the reload hopper, 32, and the refuel piston, 25, is also retracted to leave an empty portion of the refuel cylinder, 30, by the indexing of the drive port, 29, with the low pressure vent, 33, and the indexing of the passage, 31, to the high pressure passage, 28, thus reversing the pressure acting upon the refuel drive piston, 27. In FIG. 1, the reload hopper, 2, constitutes the reload mechanism and refills the empty portion of the refuel cylinder, 30, by gravity action, but other types of reload mechanism can also be used and some of these will be described hereinafter. The refuel block of FIG. 1 has rotary motion but other motion patterns can also be used, such as linear or a combination of linear and rotary motion.

The refuel block is driven through the refuel cycle by the refuel block drive means which is a means for driving the refuel mechanism through the refuel cycle at each refuel interval so that refuel block motion takes place preferably only during intake and exhaust processes and so that the refuel end of the combustion chamber is sealed during all engine compression and expansion processes. For slow and medium speed gasifiers, the drive for the refuel block can be arranged to carry out the entire refuel cycle during a single exhaust and intake process and this is called a single cycle drive means. Alternatively, the drive for the refuel block can be arranged to carry out the entire refuel cycle in a series of steps carried out over two or more gasifier cycles and this is called a multi cycle drive means. The multi cycle drive means will often be preferred in higher speed gasifiers in order to reduce the inertia forces within the refuel mechanism. At the end of each refuel interval of N engine revolutions, the refuel block drive means drives the refuel block and refuel piston through the following sequence of events which is the refuel cycle:

a. The refuel block is moved over to align the refuel piston with the combustion chamber.

b. The refuel piston is moved toward the combustion chamber with a stroke pushing a fresh char fuel quantity into the combustion chamber.

c. The refuel block is moved back to align the refuel piston and cylinder to receive another charge of fresh char fuel, for the next following refuel cycle, from the reload mechanism.

d. The refuel piston is moved back to provide space for the new charge of fresh char fuel either concurrently with or subsequently to step C above. Concurrently or subsequently the reload mechanism places a new charge of fresh char fuel into the refuel cylinder.

At the end of this refuel cycle the refuel mechanism is again ready to carry out the next similar cycle of refueling at the end of the next following refuel interval. For a single cycle drive means, steps a, b, and c are preferably completed at the time of a single exhaust and intake process of the gasifier. For a multicycle drive means each of the individual steps, a, b and c, is preferably completed within the time of a single exhaust and intake process in order to minimize leakage of compressed gases. For single cycle or multicycle drive means, step d need only be completed prior to commencement of the next following refuel cycle.

The refuel block drive means can be mechanical, pneumatic, hydraulic, electric or combinations of these. Where the free piston mechanism does not have any synchronizer linkage, a pneumatic drive means or a pneumatic initiated, hydraulic or electric assisted, drive means can be used. Where the free piston mechanism has a synchronizer linkage containing a connecting rod and unidirectional rotating crankshaft, such as, 13, of FIG. 7, crankshaft driven cams, cam followers and suitable linkage can be used as is already known in the art of mechanisms. Cams, rotated at a speed reduced in the ratio of 1/N from the synchronizer crankshaft, can be used with the refuel block drive means but either cams of very large base circle diameter are needed or the forces between cam and follower will be large. This result follows from the fact that the refuel interval, N, is typically of the order of 100 or 200 gasifier cycles whereas the refuel cycle time for steps a, b and c, is of the order of 1 or a few cycles. More reasonable cam sizes and forces can be achieved by using a dual speed drive means comprising, a refuel drive cam, driven at synchronizer crankshaft speed, which carries out the refuel cycle when its cam follower is engaged, at the end of each refuel interval, by action of the refuel interval cam, driven at a speed reduced in the ratio of 1/N from the synchronizer crankshaft. With this dual speed drive means, the refuel cycle can be carried out quickly, as desired, since the refuel drive cam acts within one or a few gasifier cycles. The refuel interval cam assures that refueling occurs only once for each refuel interval by keeping the refuel drive cam follower disengaged from the refuel drive cam until the expiration of the refuel interval and then engaging the refuel drive cam follower to the refuel drive cam for only one full refuel cycle. This engagement and disengagement of the refuel drive cam follower to and from the refuel drive cam are preferably timed to occur only when the follower would be or is on the drive cam base circle in order to minimize mechanical clatter.

A single speed refuel block drive means can be achieved by having the refuel drive cams, driven at a speed reduced in the ratio of 1/N from the synchronizer crankshaft, operate the valves of a hydraulically powered refuel block drive means. This hydraulic assisted drive means will allow use of single speed cams of reasonable size with reasonable cam forces. Electric motor or pneumatic assisted refuel block drive means can also be used.

One particular example of a mechanical, multicycle, dual speed drive means suitable for use as a drive means for the refuel block, or the refuel piston, and also suitable for use as a drive means for the ash removal mechanism, the reload mechanism and the moveable combustion chamber if used, for those free piston mechanisms using a connecting rod and unidirectional rotating crankshaft synchronizer linkage, is shown in FIGS. 10, 11 and 12. A refuel block engage cam, 34, and a refuel block retract cam, 35, are driven about the centerline, 36, at crankshaft speed. The raised section, 37, of the engage cam, 34, acts via its primary cam follower, 38, the moveable cam follower, 39, and its secondary cam follower, 40, to move the refuel block into alignment with the combustion chamber, 9, at its refuel end, 22, so that refueling can occur at the desired time in the cycle, when the moveable cam follower, 39, is engaged to the engage primary cam follower, 38. Similarly, the raised section of the retract cam, 35, acts via its primary cam follower, 41, the moveable cam follower, 39, and its secondary cam follower, 42, to move the refuel block back from the refueling position into the reloading position after the several cycles devoted to refueling have occurred, at the desired time in the cycle, when the moveable cam follower, 39, is engaged to the retract primary cam follower, 41. The several return springs act on the cam followers to carry out return motions. The interval cam, 43, is driven about the centerline, 47, at a speed reduced in the ratio of 1 to N from the speed of the crankshaft, 36, and determines to which primary cam follower, 38, 41, the moveable cam, 39, is engaged. When the interval cam follower, 44, is on the raised section, 45, the moveable cam follower, 39, is engaged to the retract primary cam follower, 41, as shown in solid outline in FIGS. 11 and 12, and retraction of the refuel block to reload occurs. When the interval cam follower, 44, is on the recessed section, 46, the moveable cam follower, 39, is engaged to the engage primary cam follower, 38, as shown in the dotted outline, 48, and engagement of the refuel block to refuel occurs. When the interval cam follower is on the base circle, 49, the moveable cam follower, 39, is not engaged to either of the primary cam followers as shown in the dotted outline, 50, and no motion of the refuel block occurs. The spring, 51, keeps the interval cam follower, 44, on the interval cam, 43. With this drive mechanism the refuel block is driven through a refuel cycle once in every N free piston mechanism cycles and the number of cycles taken for refueling is equal to the number of cycles between the recessed engage portion, 46, and the raised retract portion, 45, of the interval cam, 43. Hence both the refuel interval and the number of cycles used for refueling are fixed as set by the design of the interval cam. Preferably the cams, 34, 35, 43, are timed so that motion of the refuel block takes place during exhaust and intake processes. Also, the interval cam, 43, is timed relative to the engage cam, 34, and the retract cam, 35, so that motion of the moveable cam follower, 39, occurs only when the primary cam follower to be engaged or disengaged is on the base circle of its cam, to avoid mechanical interference.

For some kinds of multicycle drive means, such as that shown in FIGS. 10, 11, 12, the refuel block is not held in place by the drive means and a lock scheme may be desired to hold the refuel block in proper alignment during refueling and also during reloading. One example of such a lock scheme is shown in FIG. 15, as applied to the linear motion refuel block shown in FIG. 13, and comprises a lock release and drive bar, 52, spring loaded lock pins, 53, 54, and lock recesses, 55. The secondary cam followers, 40, 42, of the drive mechanism can act directly or via suitable linkage upon the ends of the lock release and drive bar, 52. As shown in FIG. 15, the lock pin, 53, is locked into the recess, 55, which holds the refuel block, 56, in proper alignment for refueling into the combustion chamber. When the retract cam follower, 42, is driven it first engages the lock release and drive bar, 52, and drives the bar through the clearance, 57, which is sufficient to retract the lock pin, 53, out of the recess, 55, by action of the linear cam, 58, and pin follower, 59, and the refuel block, 56, being then unlocked is thereafter moved by the retract cam follower, 42, into the reload position where it is then locked in proper alignment for reload by the lock pin, 54. When the engage cam follower, 40, is driven it similarly first unlocks the lock pin, 54, and then moves the refuel block, 56, into the refuel position where it is again locked in proper refuel alignment by the lock pin, 53.

An example of a single cycle drive means suitable for use with free piston mechanisms utilizing a back and forth synchronizer linkage is shown in FIGS. 4 and 5 and comprises a rocking lever, 60, a rocking barrel cam, 61, and a pneumatically actuated shuttle clutch, 62. The rocking lever, 60, is rocked back and forth during all free piston mechanism cycles through an arc of rotation about the centerline, 63, by a linkage, 64, to a moving portion of the synchronizer linkage, 12. When the shuttle clutch, 62, is engaged, as shown in FIG. 4, with the pins, 65, engaged to the rocking lever recesses, 66, and the slideable spline, 67, engaged to the barrel cam, 61, the barrel cam, 61, will also rock back and forth about the centerline, 63, through the same arc of rotation. When, however, the pins, 65, are disengaged from the recesses, 66, by sliding the shuttle clutch over toward the barrel cam, then the barrel cam, 61, is not driven by the rocking lever, 60, and is held by a spring, not shown on FIG. 4, in that position at which the pins, 65, and recesses, 66, are aligned when the power pistons are at top dead center. When rocking, the barrel cam, 61, drives the captured follower, 68, via the cam slot, 70, and the captured follower, 68, drives the refuel block via the linkage, 69. The captured follower, 68, is restrained to move only along a line parallel to the rocking centerline, 63. A developed arc view, 5—5, of the cam slot, 70, of the barrel cam, 61, is shown in FIG. 5 with the directions and extent of the rocking motion of the barrel cam shown by the arrows, 70. For driving of the refuel block the captured follower is at position, 71, in the cam slot when the power pistons are at top dead center, and is at about position, 72, in the cam slot when the power pistons are uncovering the exhaust, 19, and intake, 18, ports. The driving of the refuel block, 24, thus occurs as the captured follower, 68, passes through the portion of the cam slot, 70, between positions 72 and 73 and thus occurs during exhaust and intake processes as is preferred. The shuttle clutch, 62, is engaged and disengaged to the rocking lever, 60, only when the power pistons are at top dead center, by compressed gas applied and vented through the valve, 74, which connects at 75 to compressed gas and at 76 to low pressure vent. As shown in FIG. 4 the compressed gas acts upon the surface, 77, of the shuttle clutch, 62, and the low vent pressure acts upon the surface, 78, of the shuttle clutch which is thus pressed into engaging the pins, 65, into the recesses, 66, of the rocking lever, 60, at the next top dead center of the power pistons, and one cycle of refueling will occur. Then, however, the valve, 74, is rotated 90 degrees the low vent pressure than acts upon the surface, 77, and the compressed gas acts upon the surface, 78, of the shuttle clutch, 62, which is thus pressed into disengaging the pins, 65, from the recesses, 66, and the barrel cam, 61, then ceases to move and refueling is completed.

The refuel interval counter and control scheme shown in FIG. 6 is one example of a method for operating the valve, 74, so that a single cycle of refueling occurs at the end of each refuel interval of N free piston mechanism cycles. A mechanism counter switch, 79, counts free piston mechanism cycles by action of some portion, 80, of the synchronizer linkage, 12, and these counts are totaled in the control circuit, 81, up to the set refuel interval of N cycles, after which the control circuit, 81, resets itself to start counting up the next refuel interval and also energizes the solenoid, 82, which moves the valve, 74, as shown in FIG. 6, so that the barrel cam, 61, is engaged by the shuttle clutch, 62, to the rocking lever, 60, and a cycle of refueling occurs. Some portion, 83, of the refuel block, 24, or the drive link, 69, to the refuel block, trips the disengage switch, 84, at the end of the one refuel cycle and the solenoid, 82, is deenergized and the spring, 85, turns the valve, 74, so that the barrel cam, 61, and the shuttle clutch, 62, are disengaged from the rocking lever, 60, and refueling ceases. The control circuit, 81, can be designed, if desired, so that the refuel interval, N, can be adjusted in integral steps via an interval adjuster, 86. Such adjustment of the refuel interval can be made by hand or automatically in response to some other control scheme. Also a starting button, 87, can be added which keeps the solenoid, 82, energized during several free piston mechanism cycles in succession so that refueling is repeated for each cycle to aid in the starting of the free piston gasifier as will be explained hereinafter. Other schemes for setting the refuel interval, N, by actuating the valve, 74, can also be used.

Various mechanisms such as the examples described hereinabove can be used not only for the driving of the refuel block but also for the driving of the refuel piston, the reload mechanism and the ash removal mechanism, and different drive means can be used for these several drive needs on any one free piston gasifier.

The form of char fuel used and also the manner of controlling the refuel quantity, rwc, determine what the motion pattern of the refuel piston shall be. The gasifiers of this invention can burn char fuel in the forms of: crushed fuel, pelletized fuel, briquetted fuel, briquetted pellets or particles, or char fuel placed within containers or cannisters or can use inert porous carriers soaked with oil. The briquetted fuel forms can also be either of fixed size or of adjustable size. Examination of equation F shows that if a fixed refuel interval of N engine revolutions is used the refuel quantity, rwc, must be adjustable to accommodate variations of intake air density, da. Alternatively, if a fixed refuel quantity, rwc, is to be used, the refuel interval, N, must be adjustable to accommodate variations of power piston intake air density, da. Briquettes of fixed size and preloaded cannisters have a fixed refuel quantity, rwc, and hence the drive means must have an adjustable refuel interval, N. Adjustable briquettes and pelletized and crushed char fuel can operate with a fixed refuel interval, N, and with the refuel quantity, rwc, adjustable as, for example, by the reload mechanism. Usually the adjustable refuel quantity, rwc, will be preferred as mechanically simpler. For all of the above char fuel forms a fixed potential stroke length of the refuel piston, 25, can be used and with the piston end, 88, flush at most with the sliding surface, 89, at the end of the refuel stroke. For all of the above char fuel forms, it is essential that the refuel piston end, 88, not be indexed within the combustion chamber when refuel block motion is to occur. For briquetted char fuel and fuel in cannisters, it is essential that the end, 88, of the refuel piston, 25, be fully flush with the sliding surface, 89, at the end of the refuel stroke when refuel block motion is to occur. These requirements are needed to avoid mechanical interference. When crushed fuel or pelletized fuel are used, the refuel piston can be driven via a spring, 90, as shown in FIG. 13, with maximum piston stroke fixed but with actual piston stroke varying with the amount of fuel the spring loaded refuel piston, 91, can force into refilling the combustion chamber. The spring, 90, is recompressed when the reload mechanism forces additional fuel into the refuel cylinder during reloading. In effect, this variable actual stroke, spring actuated refuel piston adjusts the refuel quantity, rwc, at the time of refueling. A variable actual stroke can also be achieved by use of hydraulic or pneumatic drive of the refuel piston as shown, for example, in the pneumatic driven refuel piston, 25, of FIG. 1. Where it is preferred that the refuel piston force be small until refueling is to occur the pneumatic drive of FIG. 1 is preferred or, alternatively, a spring loaded refuel piston, as in FIG. 13, can be used but the spring, 90, is only compressed for driving at the time of refueling and this compressing of the spring, 90, can be carried out by any of the drive means already described hereinabove.

Where refuel quantity, rwc, is to be fixed, as with preloaded cannisters or preformed briquettes a fixed positive stroke of the refuel piston is required to place an entire cannister or briquette fully into the combustion chamber during refueling. For this purpose any of the positive drive schemes described hereinabove, and such as are shown in FIGS. 10, 11 and 12 or in FIGS. 4, 5 and 6, can be used. With these fixed refuel quantity schemes we need to adjust the refuel interval, N, to be inversely proportioned to power piston intake air density, da. Power piston intake air density can be sensed in various ways as, for example, by use of an electric pressure sensor, 92, and an electric temperature sensor, 93, as shown in FIG. 7, whose output are electrically combined in the controller, 94, so that the controller output at, 95, is inversely proportional to the power piston intake air density in the reservoir, 17. The output, 95, of the controller, 94, can be fed into the interval adjuster, 86, of the refuel interval control circuit, 81, of FIG. 6, so that the refuel interval, N, is adjusted in integral steps closest to being inversely proportional to power piston intake air density.

B4. Reload Mechanism:

The reload mechanism is a means for reloading a quantity of fresh char fuel into the refuel mechanism for use in the next following refuel cycle. This is a materials handling function and many of the means already well known in the art of materials handling will be suitable. Commonly the reload mechanism will transfer char fuel from a supply hopper or bin and place it into the refuel cylinder of the refuel mechanism. The reload mechanism may additionally function to process the fresh char fuel during such transfer, as for example, by pelletizing or briquetting the fuel. Further additionally, the reload mechanism may be used to control the quantity of fresh char fuel reloaded in order to maintain a total char fuel quantity within the combustion chamber adequate to assure essentially maximum possible reaction of the available oxygen with char fuel and which will also assure essentially maximum possible reaction of the char fuel while within the combustion chamber. All forms of the reload mechanism must perform the transfer function. Some forms of the reload mechanism will additionally perform one or more process functions. Other forms of the reload mechanism will additionally perform control functions, with or without process functions. A simple reload mechanism is shown in FIG. 1, and comprises the reload hopper, 32, from which crushed or pelletized char fuel can reload by gravity into the refuel cylinder, 30, of the refuel block, 24.

One example form of positive reload mechanism is shown partially in FIG. 13, suitable for use with a refuel piston, 91, driven by a spring, 90, and comprises a refuel hopper, 96, a hopper valve, 97, a reload cylinder, 98, and a reload ram, 99, and these are shown in FIG. 13, aligned for reload with the refuel cylinder, 100, and refuel piston, 91, From the char fuel hopper, 96, a quantity of fresh char fuel is delivered, by rotation of the hopper valve, 97, into the reload cylinder, 98. The reload ram, 99, then forces this char fuel quantity into the refuel cylinder, 100, and against the spring loaded refuel piston, 91. The volume of the char cavity, 101, as shown in FIG. 14 in the hopper valve, 97, is adjustable by moving the cavity block, 102, via the control link, 103, the cavity block being preferably locked when refilling from the hopper, 96, occurs and released for control link adjustment when the hopper valve is empty and being rotated back after delivering the char quantity into the reload cylinder, 98. The hopper valve, 97, can be rotated by any one of several means as, for example, via linkwork from the refuel block, 56, as the refuel block moves into the reload position at the end of a refuel cycle.

Where pre-pelletized or crushed char fuel is supplied to the hopper, 96, the reload ram, 99, can deliver the refuel quantity into the refuel cylinder, 100, against the spring loaded refuel piston, 91, and the reload ram, 99, then holds a fixed position flush with the sliding surface, 104, of the refuel block, 56, until the next refueling cycle has commenced, in order to prevent the refuel quantity from spilling back into the reload cylinder, 98. Subsequently, the reload ram, 99, can be withdrawn to pick up the next char fuel quantity. The reload ram, 99, can be positively driven as described above with any of the positive drive means already described hereinabove, such as are shown in FIGS. 10, 11, 12, or in FIGS. 4, 5, 6, with reload time to occur when the refuel block, 56, has completed refueling the combustion chamber and is aligned with the reload cylinder.

As shown by equation F the refuel quantity, rwc, which is also the reload quantity of fresh char fuel, varies directly with the power piston intake air density, da, and the refuel interval, N. Thus, if a fixed refuel quantity, rwc, is used the refuel interval, N, must be adjusted for variations of air density, da. Alternatively, a fixed refuel interval, N, can be used and the refuel quantity, rwc, is adjusted for variations of power piston intake air density, da. In the FIGS. 13 and 14 form of reload mechanism, this adjustment of the refuel quantity, rwc, is made by moving the cavity block, 102, in or out of the hopper valve char cavity, 101, via the control link, 103. An air density sensor and control can be used as a means for adjusting the refuel quantity to be proportional to the power piston intake air density.

Power piston intake air density, da, being directly proportional to intake air absolute pressure, P2, and inversely proportional to intake air absolute temperature, Ta, can be sensed via the ratio of these two measured quantities. An electronic-mechanical control device using electrical pressure and temperature sensors as input can produce a mechanical output proportional to air density, da, for adjustment of the refuel quantity, rwc, by methods already well known in the art of electronic-mechanical controls.

Alternatively, intake air pressure and temperature can be sensed and their ratio obtained mechanically to produce a mechanical control output for refuel quantity directly proportional to intake air density. One example of such a mechanical air density sensor and control scheme is shown in FIGS. 19 and 20, wherein an intake air pressure sensor, 105, acts via a lever, 106, whose length is set by an intake air temperature sensor, 107, upon the refuel quantity control lever, 103, to set the refuel quantity, rwc. Power piston intake air pressure acts via the connection, 109, upon the sealed and evacuated aneroid chamber, 110, the motion of whose end, 111, against the spring, 112, is thus proportional to intake air pressure. The aneroid housing is pinned to the stationary point, 113, and the pivot, 114, of the refuel quantity control lever, 115, is pinned to a stationary point. Thus the end, 116, of the lever, 106, is moved in proportion to absolute power piston intake air pressure. The length of the lever, 106, about the pivot, 114, is set by the power piston intake air temperature sensor, 107, shown in greater detail in FIG. 20. Intake air passes, via the connections, 117 and 118, over the temperature responsive element, 119, and thus brings this element up to intake air temperature. A sealed, partially liquid filled, vapor pressure temperature sensor is shown in FIG. 20 whose vapor pressure acts against the spring, 119, to change the length of the lever, 106, in approximate proportion to the absolute intake air temperature. Other types of temperature sensors can be used such as bimetallic elements, liquid expansion elements or gas expansion elements. In most cases these various temperature sensors will respond only approximately linearly to absolute temperature but the response can be made adequately close to linear over the rather narrow range of usual intake air temperatures. With the lever, 106, arranged at right angles to the motion of the pressure sensor, 105, the resulting motion at the end, 120, of the refuel quantity control lever, 115, is proportional to the ratio of absolute intake air pressure to absolute intake air temperature and hence to intake air density, da. The refuel quantity control lever, 115, can act via suitable linkage, 103, to so adjust the cavity block, 102, in the hopper valve, 97, that the refuel quantity, rwc, increases in proportion to intake air density, da, as desired. The intake air density sensor and control scheme shown in FIGS. 19 and 20 is only one example of a mechanical device and other types of air density sensor and control schemes can also be used.

The power piston intake air density, da, may vary widely during a refuel interval, N, for applications with rapid and large gasifier output variations. For these applications, the averaged intake air density is preferably used to control refuel quantity, rwc. For example, an averaging, double acting, dashpot can be linked to the mechanical air density sensor and control shown in FIGS. 19 and 20, so that the control links, 115, and 103, move very nearly in proportion to the average air density during the preceding refuel interval. Where electronic-mechanical air density control schemes are used, electronic averaging devices can be employed to average the air density over the preceding refuel interval.

An example of a pneumatically driven reload mechanism is shown in FIG. 16 and comprises the reload hopper, 120, the reload cylinder, 121, the reload piston, 122, driven by the reload drive piston, 123, which is actuated by compressed gas via the reload drive valve, 124. As shown in FIG. 16, the reload cylinder, 121, is aligned with the refuel cylinder, 30, and the refuel drive piston, 27, is vented to low pressure. Thus when air pressure is applied to the drive face, 125, of the reload drive piston, 123, the reload piston, 122, forces char fuel into the refuel cylinder, 30, completely refilling it, and the valve, 124, is shown in this drive position with high pressure gas supplied at, 126, and vent at, 127. When the refuel block, 24, is moved from the refuel cylinder being aligned with the reload cylinder, 121, into alignment with the refuel end, 22, of the combustion chamber, 9, the reload drive valve, 124, is rotated ninety degrees via the link, 128, from the refuel block, and the high pressure gas is applied to the retract face, 128, of the reload drive piston and the reverse face, 125, is vented and thus the reload piston is fully retracted. Fresh char fuel then feeds by gravity from the reload hopper, 120, to refill the reload cylinder, 121, for the next reloading. When the refuel block, 24, is moved from the refuel cylinder being aligned with the combustion chamber, 9, into alignment with the reload cylinder, 121, the reload drive valve, 124, is rotated back ninety degrees via the link, 128, from the refuel block, and is then again in position, as shown in FIG. 16, to drive the reload piston and reload the refuel cylinder. The pneumatic drive reload mechanism shown in FIG. 16 does not act to control the refuel quantity, rwc, but simply refills the refuel cylinder of the refuel mechanism.

If a char fuel of essentially zero ash content is being used in a char burning free piston gasifier of this invention, the pneumatic reload mechanism of FIG. 16, or the gravity reload of FIG. 1, together with the pneumatic refuel mechanism of FIG. 1 offers simple means for controlling refuel quantity, rwc. The combustion chamber, 9, is simply refilled at each refueling to replace whatever char fuel volume has been consumed and refuel quantity control occurs in this way. By designing both the refuel mechanism and the reload mechanism with delivery capacity at least equal to the maximum useable value of rwc a fixed refuel interval, N, can also be used. This same simple and preferred reload and refuel scheme can also be used with high ash fuels, requiring use of an ash removal mechanism, by use of an ash removal control as described hereinafter.

B5. Ash Removal Mechanism:

The ash removal mechanism is a means for removing ashes from the combustion chamber and dumping these ashes outside the gasifier and also for sealing the ash removal end of the combustion chamber against gas leakage during all compression and expansion processes. The ashes can be thusly removed from the combustion chamber either as molten ash or as dry ash powder and either in batches at intervals or essentially continuously if the ash is molten. Ash fusion temperatures vary with the char fuel origin and also with the type of gas atmosphere in which formed. For coal and coal derived char, ash fusion temperatures commonly lie between about 2200° F. and 2700° F. and thus for molten ash removal, the ash bin and the ash removal region of the combustion chamber should be kept at a temperature above about 2700° F. For dry ash removal, the ash bin and the ash removal region of the combustion chamber should be kept at a temperature below about 2000° F. For some coals and for char fuels of other origins, the desired ash bin temperatures may differ from the above approximate values.

The operating temperature of the ash bin and the ash removal end of the combustion chamber depends partly on the average gas temperature of the gaseous working fluid, partly on the extent of insulation or cooling provided at the ash removal end, and partly on the kinds of gases actually reaching the ash removal end of the combustion chamber. For molten ash removal, the needed high ash bin temperatures can be secured by insulating the ash removal end of the combustion chamber and/or by using non-porous combustion chamber walls at the ash removal end so that only the hot gases which have passed through burning char reach the ash removal end of the combustion chamber. For dry ash removal the needed low ash bin temperatures can be secured by improved cooling of the ash removal end of the combustion chamber and/or by using porous combustion chamber walls at the ash removal end so that cold compression air also reaches the ash removal end of the combustion chamber. Deliberate addition of selected extra ash materials to the fresh char fuel can be used to either increase or decrease the net ash fusion and softening temperatures in order to accommodate otherwise unuseable fuels to a particular gasifier.

With batch removal of ashes the weight of ashes removed, rwa, at each ash removal interval of na free piston mechanism cycles is given by the following approximate relation:

$$(rwa) = 0.175(da)(G)(VD)(na)\%Ash/100$$

The ash bin available removal volume needs to be at least large enough to contain the largest quantity, rwa, created at maximum useable power piston intake air density, da, and maximum expected fuel ash content, % Ash. Since gasifier output is most readily controlled via control of intake air density, da, we can either remove an essentially constant ash quantity, rwa, at adjustable ash removal intervals, na, or remove a variable ash quantity, rwa, at fixed ash removal intervals, na. Many different schemes for batch removal of ashes can be used and the example schemes described herein are not intended to limit the invention to these described schemes.

The example ash removal mechanism shown partially in FIG. 1 comprises an ash removal block, 129, an ash removal cylinder, 130, an ash removal piston, 131, an ash removal drive piston, 132, and a gas sealing means, 133. When the gasifier is running and ash removal is not taking place, the ash removal cylinder, 130, and piston, 131, are aligned, as shown in FIG. 1, with the ash removal end, 134, of the combustion chamber, 9, and the ash removal drive piston, 132, is vented via the port, 135, to the low pressure connection, 136, so that the ash removal piston, 131, is fully retracted into the ash removal cylinder, 130. As combustion continues and burned up char is periodically replaced by fresh char from the refuel end, 22, of the combustion chamber, 9, the ashes are pushed along toward the ash removal end, 134, and here accumulate in the ash removal cylinder. At the end of the ash removal interval, the ash removal drive means drives the ash removal block, 129, and the ash removal piston, 131, through the ash removal cycle consisting of the following events occurring in sequence as listed:

1. The ash removal drive means is engaged and rotates the ash removal block, 129, through ninety degrees, thus aligning the port, 135, to the high pressure gas connection, 137, and aligning the port, 138, to the low pressure connection.

2. The high pressure gas acting upon the ash removal drive piston, 132, pushes the ash removal piston, 131, fully through the ash removal cylinder, 130, thus dumping the accumulated ashes into the ash dump via the ash tube, 139.

3. The ash removal drive means returns the ash removal block, 129, back through ninety degrees and into realignment with the ash removal end, 134, of the combustion chamber, 9. Indexing of port, 135, with the low pressure vent, 136, and the power cylinder pressures acting on the ash removal piston, 131, push the ash removal piston back into the fully retracted position shown in FIG. 1.

At the end of this ash removal cycle, the ash removal mechanism is restored to its original situation and is ready to go through the next such cycle at the end of the next ash removal interval of na free piston mechanism cycles. Just as for the refuel mechanism drive means the ash removal drive means can be either single cycle or multi cycle. For a single cycle ash removal drive means, the ash removal cycle is carried out during a single exhaust and intake process. For a multicycle ash removal drive means, each of the separate steps of the ash removal cycle are preferably carried out during a single exhaust and intake process.

The ash removal drive means is a means for driving the ash removal mechanism through the ash removal cycle at each ash removal interval so that ash removal block motion takes place preferably only during intake and exhaust processes and so that the ash removal end of the combustion chamber is sealed against gas leakage during all compression and expansion processes. Any of the drive means suitable for the driving of the refuel mechanism, such as those described hereinabove, can also be used for the driving portion of the ash removal mechanism.

The example ash removal scheme shown in FIG. 1 and described hereinabove has a fixed ash removal quantity, rwa, and so for this scheme the ash removal interval, na, is to be adjusted to conform to the ash accumulation rate inside the combustion chamber, 9.

Char volume sensors and controls can also be used as ash level sensors and controls for setting refuel quantity, for setting refuel interval, or for setting ash removal interval. As char volume decreases due to burnup, on a dual process gasifier, exhaust gas oxygen content rises, exhaust gas temperature decreases, and exhaust gas carbon dioxide content decreases since the carbon available becomes eventually inadequate to fully utilize the oxygen available inside the char pore spaces. For a unit process gasifier exhaust gas carbon dioxide content increases as char volume decreases. Any of these quantities which vary with char volume can be sensed with suitable exhaust gas sensors and the sensor output can act via a control device to either increase refuel quantity or decrease refuel interval or shorten ash removal interval as suitable for the gasifier control scheme being used.

The ash removal interval can be set to occur whenever the char volume sensor indicates that the char volume is starting to become inadequate to react fully with the available oxygen inside the pores. A fixed and large volume of ashes can then be removed at this ash removal interval and thereafter the char volume will be adequate until near the end of the next ash removal interval.

An example of the use of such a char volume sensor scheme for setting the ash removal interval is shown in FIG. 1 and utilizes an exhaust gas content sensor, 140, capable of sensing either exhaust oxygen content increase for dual process gasifiers or exhaust carbon dioxide content increase for unit process gasifiers. The output of the sensor, 140, is input to the control device, 141, which energizes the solenoid, 142, whenever the char volume is sensed as becoming inadequate. The solenoid, 142, rotates the valve, 143, which actuates the ash removal block, 129, via an ash removal drive means as shown in FIGS. 4 and 5 with the ash valve, 143, taking the place of the valve, 74, in FIG. 4, and the high pressure connection being at 144 and the vent connection being at 145. The switch, 146, is actuated by a portion, 147, of the synchronizer linkage, 12, so that after one ash removal cycle has been carried out, the solenoid, 142, is deenergized with the power pistons at or near top dead center. The spring, 146, then rotates the valve, 143, back ninety degrees and the ash removal drive means is disengaged. In this way a single ash removal cycle occurs at the end of each ash removal interval, na, as determined by the char volume sensor, 140. Thereafter the combustion chamber, 9, is again refilled with char fuel at the next refuel cycle by action of the refuel mechanism of the refilling type such as shown, for example, in FIG. 1, and the char volume is again adequate. Preferably the sensor, 140, and control device, 141, are adjusted so that the ash volume in the combustion chamber, when ash removal occurs, is somewhat greater than the maximum displacement volume of the ash removal piston, 131, in the ash removal cylinder, 130. This adjustment can be made in various ways as, for example, raising the exhaust gas content of either oxygen content or carbon dioxide content at which the control device, 141, initiates ash removal until the thusly removed ashes are essentially free of unburned carbon. In this way, efficiency loss due to unburned carbon in the ash can be minimized.

Where the ashes are kept molten in the combustion chamber, an essentially continuous bleeding out of the ashes can be used, as for example is shown in FIG. 17. The combustion chamber, 9, is arranged vertically so the liquid ashes will flow downward to the ash valve, 148, which can seat and seal against the ash valve seat, 149, and these elements are made of high temperature materials such as ceramics. When little or no molten ash is at the ash valve, it is seated and gas leakage sealed against the ash valve seat, by power cylinder gas pressures acting on the differential area of the valve head, and by refueling forces. When molten ash has accumulated around the ash valve, 148, it will float open, since the head is followed out to make it lighter than molten ash, and molten ashes will flow out of the combustion chamber, 9, and be deflected away from the valve guide, 150, by the skirt, 151. A more positive and assured opening of the ash valve, 148, can be obtained by also spring loading the ash valve stem, 152, to offset valve weight in the opening direction. Hence, the ash valve will be open and bleeding out molten ashes only when there are ashes to be removed and in this way gas leakage via the ash valve is prevented and the ash level is maintained approximately constant. When the gasifier is to be stopped, it is necessary to blow down the molten ashes from the combustion chamber and to keep the ash valve open until the gasifier is again started up to avoid freezing up the molten ashes inside the combustion chamber. This blowdown and valve opening can be readily accomplished by a hand or automatically actuated lever, 153, which fully opens the ash valve, 148, several cycles before stopping and holds the valve thusly open so that the high cylinder gas pressures blow down the molten ashes out of the combustion chamber, and the ash valve remains open until the next starting. This molten ash removal scheme has the advantages of simplicity, ready handling of varying fuel ash content, and maintenance of an approximately fixed ash level without the need of ash level sensors. When used with a spring or pneumatic pressure loaded refilling type of refuel piston and pelletized or crushed char fuel, a preferred combination results of great mechanical simplicity and ease of control.

A continuous molten ash bleed via a small orifice, without an ash valve, can also be used and is mechanically simple. With low ash content fuels gas leakage may occur via the ash bleed orifice but this condition can be corrected by deliberate addition of ash constituents into the char fuel in order to maintain sufficient molten ash inside the combustion chamber as to gas seal the ash bleed orifice. An ash level sensor can be used to control the quantity of ash material to be thus deliberately added. For gasifier stopping a low ash fuel is used until the ash bleed orifice has fully blown down the molten ashes.

An example of one type of ash removal mechanism with fixed ash removal interval, na, and variable ash quantity, rwa, is shown partially in FIG. 18, and comprises a linear motion ash removal block, 154, an ash removal cylinder, 155, a spring loaded ash removal piston, 156, an ash removal piston drive link, 157, an ash removal drive cam, 158, and an ash removal piston loading spring, 159. As shown in FIG. 18 the ash removal piston, 156, has just been driven fully through the ash removal cylinder, 155, by action of the raised portion, 160, of the linear ash removal cam, 158, and the drive link, 157, so that ashes are dumped into the ash bin, 161. The ash removal block is then returned so that the ash removal cylinder, 155, and the ash removal piston, 156, are aligned with the ash removal end, 134, of the combustion chamber, 9, and as ashes accumulate the refuel drive means forces these ashes into the ash removal cylinder, 155, against the forces of the spring, 159. Whatever ashes are thus accumulated inside the ash removal cylinder are then removed at the next ash removal cycle after a fixed ash removal interval. The ash removal piston, 156, as a pressure balancing hole, 162, and the drive link has a packing gland, 163, to prevent ash removal piston motion due to gas pressure changes and to minimize gas leakage. The ash removal block, 154, can be thusly driven through an ash removal cycle by any of various kinds of ash removal drive means such as those described hereinabove for refuel drive means. For example, the multicycle drive means of FIGS. 10, 11, 12 could be used together with the locking scheme of FIG. 15 to drive the ash removal block, 154, via the secondary cam followers, 40, 42, and the locking bar, 52.

The position of the ash zone within the combustion chamber can be determined by placing a grate within the combustion chamber which effectively separates the regions of burning char from the regions of ash by allowing essentially only ash to pass through the grate. One arrangement of a fixed grate, 164, is shown in FIG. 22 as assembled toward the ash removal end of the combustion chamber, 9. Where the grate is fixed to the combustion chamber wall, it is necessary to use a spring loaded or pneumatic driven refuel piston with pelletized or crushed char fuel and briquettes cannot be used. If briquettes are to be used, the grate can be made moveable along the direction of refueling and is preferably spring loaded against the refuel force. This spring loaded, moveable grate can also be used as a mechanical ash level sensor to control the refuel quantity.

Many different kinds of ash removal mechanisms can be used, of which several examples are described hereinabove, and these can be used in various combinations with the many different kinds of refuel mechanisms and control schemes. Certain combinations of ash removal mechanism, refuel mechanism, and control scheme cannot, however, be used due to mechanical interference problems or control problems or other problems. For example, briquetted fuel and a briquette refuel mechanism cannot be used with any of those ash removal mechanisms of fixed position, such as the fixed molten ash bleed valve scheme or the fixed ash piston scheme of FIG. 1. Similarly, unuseable are combinations of fixed position ash removal mechanisms with refuel mechanisms wherein refuel quantity is controlled in order to control ash zone level.

Where the char fuel is placed in containers or cannisters of fixed volume, or where an inert porous carrier is used to carry an oil fuel, the refuel stroke of placing fuel into the combustion chamber must occur concurrently with the cannister or container removal stroke of the ash removal cycle, and, additionally, the refuel piston stroke must equal the ash removal piston stroke in order to avoid mechanical interference. Hence, the ash removal interval, na, is equal to the refuel interval, N. If the cannisters are preloaded with a fixed refuel quantity, rwc, the refuel interval, N, and hence also the ash removal interval, na, are to be controlled, to hold ash level approximately fixed in the combustion chamber, via an ash level sensor and control scheme as described hereinbelow.

B6. Refuel and Ash Controls:

In a continuously running gasifier whose refuel quantity, rwc, is controlled, either by volume or by weight, by a power piston intake air density sensor and control, it must eventually occur that the refuel quantity, rwc, is either somewhat too small or somewhat too large. These discrepancies of a controlled refuel quantity must inevitably arise not only due to the imperfections of the refuel quantity control scheme but especially due to variations in ash content of the fresh char fuel being refueled. The fresh char fuel can also vary in other ways as, for example, in porosity and density. When the refuel quantity is thusly inadequate for a period of running char volume in the combustion chamber gradually decreases and eventually the available char pore reaction area may become inadequate to fully utilize the available oxygen inside the pores and the gasifier output will then gradually decrease even though intake air pressure is maintained. On the other hand, when the refuel quantity is too large for a period of running, the char volume in the combustion chamber gradually increases and eventually unburned char will be forced into the ash removal means and discharged from the combustion chamber incompletely burned producing a loss of fuel efficiency. To avoid both of these undesireable effects the refuel quantity, rwc, can be adjusted to maintain a total char quantity within the engine combustion chamber adequate to assure essentially maximum possible reaction of the available oxygen with char fuel and which will assure essentially maximum possible reaction of the char fuel while within the combustion chamber. Of course, perfect oxygen utilization and perfect char burning can never be fully attained. The total char quantity can be assessed at that portion of the combustion chamber not occupied by ashes and the boundary region between the ashes and the char is herein referred to as the ash zone and its position within the combustion chamber as the ash level. Moving the ash level closer to the refuel end of the combustion chamber allows the char fuel greater time to be burned up but will eventually result in incomplete utilization of the available oxygen inside the pores. Moving the ash level closer to the ash removal end of the combustion chamber provides the oxygen improved opportunity to react with char fuel but will eventually result in discharging unburned char with the ashes. Hence an ash level sensor and control scheme can be used to maintain the ash zone at that ash level representing the best balance between oxygen utilization on the one hand and char burn up on the other. When the ash level sensor finds the ash level too close to the refuel end of the combustion chamber, it is to actuate the control scheme to increase the refuel quantity, rwc, and thus cause the ash level to move away from the refuel end. When the ash level sensor finds the ash level too close to the ash removal end of the combustion chamber, it is to actuate the control scheme to decrease the refuel quantity, rwc, and thus cause the ash level to move away from the ash removal end.

Sensing of the ash level position in the engine combustion chamber can be done by various methods, such as temperature gradient methods, electrical conductivity methods, and by position sensor methods if a moveable ash grate is used. If the ashes are to be removed in a molten state, the ash level can be determined from the larger electrical conductivity of molten ash as compared to the char fuel. Alternatively, the ash level of the molten ash can be determined from the large change of temperature gradient from almost zero within the molten ash to large values within the char adjacent thereto. If the ashes are to be removed in a dry state, the ash level can be determined from the temperature gradient between the gases emerging from burning char and the gases emerging from unreactive ashes. Alternatively, the ash level of the dry ash can be determined from the larger electrical conductivity of the char as compared to the dry ash.

Use of a moveable grate to essentially separate the burning char regions from the regions of burned up ashes provides a simple mechanical ash level sensor means since the grate constitutes an adequate approximation to the ash zone. With this moveable grate a mechanical link can connect from the grate or grate housing directly to an adjuster, for example on the control link, 103, of the cavity block, 102, in the hopper valve, 97, of the reload mechanism. The adjuster on the control line can be of the same type as that described hereinafter for the example temperature gradient ash level sensor.

Where electrical temperature gradient sensors or conductivity sensors are used, the control scheme is preferably an electronic-mechanical device using the sensors output as its input and generating, as control device output, a mechanical adjustment of the refuel quantity, rwc, by methods already well known in the art of electronic-mechanical devices.

One example of such an electronic-mechanical ash level sensor and control is shown in FIG. 21 and comprises an electrical temperature sensor, 165, placed on one side of the preferred ash level position, 166, another electrical temperature sensor, 167, placed on the other side of the preferred ash level position, 166, with burning char on one side, 174, and burned up ashes on the other side, 175. A control circuit, 168, energizes either one solenoid, 169, or the other solenoid, 170, or neither solenoid of this double acting solenoid. Each solenoid, when energized pulls the refuel quantity control link, 171, towards itself and the springs, 172, 173, center the control link, 171, between these two positions. When solenoid, 169, is energized the control link, 171, acts to increase the refuel quantity, rwc, when solenoid, 170, is energized the control link, 171, acts to decrease refuel quantity, rwc, and when neither solenoid is energized the refuel quantity is not changed. The control link, 171, can thusly act to change the refuel quantity in various ways as, for example, by use of the ratchet driven turnbuckle described hereinbelow. Were the ash zone, 166, to move over into the region, 174, both temperature sensors would be adjacent to cooler ashes and the control circuit, 168, would energize solenoid 169 in order to increase the refuel quantity, rwc, and thus restore the ash level to the desired position, 166. Were the ash zone, 166, to move over into the region, 175, both temperature sensors would be adjacent to hotter burning char and the control circuit would energize solenoid 170 in order to decrease the refuel quantity, rwc, and thus restore the ash level to the desired position, 166. When the ash level is at the desired position, 166, the temperature sensor, 165, is adjacent cooler ashes and the temperature sensor, 167, is adjacent hotter burning char and the control circuit, 168, would not energize either solenoid, 169 or 170, so the refuel quantity would not change. In this way, the ash level sensor and control shown in FIG. 21 acts to keep the ash zone, 166, at or near the desired level within the engine combustion chamber, 9, by adjusting the refuel quantity, rwc, via the control link, 171. The control link, 171, can act thusly directly on, for example, the cavity block, 102, in the hopper valve, 97, of the fuel charging mechanism shown in FIGS. 13 and 14, Preferably, however, the control link, 171, can act indirectly upon, for example, the control link, 103, connecting to the cavity block, 102. A turnbuckle with right and left hand threads can be located in the refuel quantity control link, 103, and rotated by action of the pawls of a double acting, shielded pawls ratchet drive. One example arrangement of this ratchet driven turnbuckle is shown in FIG. 6 and comprises the turnbuckle, 176, threaded right and left hand on its inner bore, 177, and fitted with a ratchet, 178. The two pawls, 179, 180, are pivoted at, 181, on the pawls arm, 182, which latter is moved back and forth about the centerline, 183, via the linkage, 184, from the refuel mechanism. The pawls shield, 185, is rotatable about the center-line, 183, and is connected at, 186, to the ash sensor control link, 171. The pawls shield, 185, has a lifted section, 187, of sufficient arc length that both pawls, 179, 180, are unengageable to the ratchet, 178, when the shield is centered on the pawls arm mid travel, and only one pawl is engageable to the ratchet, 178, when the shield is to either extreme of its motion by the ash sensor control link. Clearly pawl, 179, rotates the ratchet, 178, and turnbuckle, 176, in one direction and pawl 180 in the opposite direction when engaged. The turnbuckle bolts, 188, are placed, for example, into the control link, 103, connecting to the cavity block, 102, of the reload refuel quantity control scheme. The pawls shield is so connected to the ash sensor control link, for example control link, 171, that the refuel quantity, rwc, is incrementally increased by action of this ratchet and turnbuckle mechanism whenever the ash level is too close to the refuel end of the engine combustion chamber; is incrementally decreased by action of this ratchet and turnbuckle mechanism whenever the ash level is too close to the ash removal end of the engine combustion chamber; and is left unchanged whenever the ash level is at the desired position in the engine combustion chamber.

Instead of controlling the refuel quantity, rwc, as described above, we can alternatively control the refuel interval, N, and this refuel interval control is necessary when a fixed refuel quantity, rwc, is used as with cannistered fuel or pre-briquetted fuel. The ash level sensor and control, or the air density sensor and control or a combination of both controls, can act to set and adjust the number of free piston mechanism cycles, N, to which a mechanical or electrical cycles counter device must count up before both tripping itself to start counting again and also engaging the drive means to drive the refuel mechanism and subsequently the reload mechanism. For example, the ash level sensor control link, 171, of FIG. 21, or the turnbuckle bolts, 188, of FIG. 26, could act upon the interval adjuster, 86, of the control circuit, 81, of FIG. 6, to adjust the refuel interval. Alternatively, the control circuit, 168, could act directly upon the control circuit, 81, to adjust the refuel interval as desired. With this refuel interval control scheme, the frequency of refueling is increased by shortening the refuel interval whenever more char fuel is needed in the combustion chamber, as when the intake air density increases, or when the ash level is too close to the refuel end. Correspondingly, the refuel interval is lengthened whenever less char fuel is needed in the combustion chamber.

Hereinabove two different control schemes have been described for adjustment of the refuel quantity, rwc, air density control schemes, and ash level control schemes. These two different control schemes can be used alone or preferably in combination. When both control schemes are used in combination, the refuel quantity, rwc, is quickly adjusted for wide variations of output as controlled by intake air density, da, and is additionally gradually corrected for variations in fuel properties by action of the ash level control.

Each power cylinder of a multicylinder char burning free piston gasifier must be served by a reload mechanism and such a gasifier can be equipped with one reload mechanism for each power cylinder. Alternatively, a single reload mechanism can serve several power cylinders or preferably all power cylinders of the gasifier, the reload mechanism being moved along from cylinder to cylinder to reload the separate refuel mechanism for each cylinder. Where the preferred single reload mechanism is used for all cylinders of a multicylinder gasifier, several arrangements for the control of refuel quantity, rwc, can be used as, for example:

1. Each cylinder has its own hopper valve and controlled cavity block connecting to its own ash level sensor and control and a common air density sensor and control.

2. All cylinders are served by the same hopper valve and controlled cavity block connecting to a common air density sensor and control and a single ash level sensor and control located in a "typical" power cylinder.

3. All cylinders are served by the same hopper valve and controlled cavity block which is adjusted, just prior to each reloading, by the ash level sensor and control for the cylinder about to be reloaded, the air density sensor and control being the same for all power cylinders.

Other control arrangements can also be used.

B7: Oil Fueling:

The char burning free piston gasifiers of this invention are not only capable of burning solid char fuels, a fuel heretofore unuseable for free piston gasifiers, but additionally can burn oil soaked char fuels and oil soaked inert pellets. These two latter oil-based char fuels may be particulary useful for use when coal char fuels are not readily available. Preferred oils for these applications are residual type materials, heavy tars, asphalts, and slurries of oil and char fuel as they will yield appreciable coke or char type material when burning commences in the combustion chamber.

When inert pellets are used as an oil carrier for the char fuel, these are to be made of a high temperature material, such as a porous ceramic. Since the volume of these inert pellets is not appreciably changed by combustion, the refuel and ash removal mechanisms must be of the essentially equal volume type as described hereinabove for cannisters. The refuel interval, N, is preferably constant, however, since the refuel quantity of oil is more easily controlled separately from the refuel and ash removal processes. The inert pellets can be recycled back from the ash removal mechanism into the reload mechanism via any suitable means for recycling which is external to the combustion chamber. Preferably, the refuel quantity of oil, rwo, is poured on to the inert pellets, or onto other char fuel if used, during the intake process or early in the compression stroke at the latest. In this way the liquid fuel is forced deeply into the pores during the following compression process and the needed large area of fuel is thusly created. The refuel quantity of oil may also be placed on the inert pellets or other char fuel outside the gasifier as, for example, within the refuel mechanism or within the reload mechanism. Special liquid fuel can be sprayed on to the inert pellets or other char fuel via this oil fuel spray nozzle, as a starting means.

Where oil fuel is used alone on inert pellets, the refuel quantity of oil, rwo, can be separately metered and controlled and is given by the following approximate relation:

$$rwo = (0.0714)\,(da)\,(VD)\,(N)\,(U)$$

Wherein the air utilization factor, U, is the proportion of the gasifier air actually used in the combustion of the oil and is similar to the pore reaction ratio, G, but allows for combustion of volatile matter and evolved gases. This air utilization factor, U, depends, as does G, upon the combustion chamber geometry and the pore volume, and additionally depends upon the fuel volatile matter content, but is very nearly a constant for a particular gasifier using a particular fuel. With the preferred constant refuel interval, N, we want to control refuel quantity of oil, rwo, in direct porportion to power cylinder intake air density, da, and the various refuel quantity control schemes described hereinabove can be used for this purpose. This refuel quantity control device can act on the oil fuel delivery pump to control the refuel quantity of oil, rwo, by various methods already well known in the art of liquid fuel pumps.

One example of a pneumatically actuated oil pouring arrangement is shown partially in FIG. 1 and comprises an oil pour nozzle, 189, oil metering cup, 190, main oil fuel supply and return lines, 191, special oil starting fuel supply and return lines, 192, and oil fuel selector valves, 193. The oil pour nozzle, 189, is shown in greater detail in FIG. 3, as located within the refuel piston, 25, and comprises an oil pump plunger, 194, driven by a pneumatic piston, 195, and return spring, 196, a fresh oil supply passage, 197, and suction check valve, 198, a pour nozzle, 199, and delivery check valve, 200, and a compressed gas supply pipe, 201, to one side of the pneumatic drive piston, 195, with a vent pipe, 202, on the other side of the drive piston. With the refuel block, 24, rotated into the refueling position, as shown in FIG. 1, the compressed gas supply pipe, 201, will line up with the compressed gas supply port, 203, and the vent pipe, 202, will line up with the vent port, 31, as the refuel piston, 25, completes its refuel stroke, and in consequence the drive piston, 195, and the oil pump plunger, 194, are pneumatically driven to complete a full pumping stroke during which whatever fuel is located in the oil pump cylinder, 204, is forced via the delivery check valve, 200, through the pour nozzle, 199, on to any char fuel or inert carrier material being refueled into the refuel end, 22, of the combustion chamber, 9, the suction check valve, 198, being closed by the delivery pressure. For this example arrangement shown in FIG. 1 this pouring of the oil fuel on to the char fuel will occur concurrently with the placement of the char fuel, or inert carrier, into the combustion chamber and can thus be timed to occur prior to commencement of the next following compression process in the power cylinder, as is preferred in order to force the poured oil, by compression, into the interior pore spaces. After refueling the refuel block, 24, is rotated ninety degrees into the reload position and the compressed gas supply pipe, 201, and port, 203, are then vented, whereas the vent pipe, 202, and vent port, 31, are then subject to compressed gas as described earlier herein. In consequence, the drive piston, 195, and oil pump plunger are driven back to the position shown in FIG. 3 and this suction stroke draws fresh liquid fuel via the suction line, 205, from the metering cup, 190, into the oil pump cylinder, 204, via the suction check valve, 198, the delivery check valve, 200, being now spring closed. The quantity of oil fuel thus drawn into the oil pump cylinder, and hence the quantity of oil next poured on to the next refuel quantity of char fuel, is set by the metering cup, 190, and this metering function can be accomplished in many different ways as is already well known in the art of liquid fuel metering. One rather simple form of metering cup, 190, is shown in FIG. 2 and comprises an adjustable cup, 206, connecting to the suction pipe, 205, and to the oil fuel supply line, 207, an overflow reservoir, 208, connecting to the return line, 209, and an adjustable displacer, 210. This adjustable displacer, 210, determines how much oil fuel remains in the adjustable cup, 206, and hence the amount of oil fuel drawn into the oil pump cylinder, 204, during its suction stroke. Hence the refuel oil quantity, rwo, can be adjusted by adjusting the displacer, 210, and this can be done by hand or automatically, as for example, in response to power cylinder intake air density. When the gasifier is to be started, the supply and return lines, 207, 209, can be connected via the selector valves, 193, to a starting fuel supply tank.

B8: Starting:

To start the char burning gasifier requires that a portion of the char fuel in the combustion chamber be heated to a temperature at which char will react rapidly with oxygen in the adjacent compressed air, and that the pistons be reciprocated to start. Rapid reaction temperatures vary between different chars and are influenced by catalysts, but practically all chars will react rapidly with air at temperatures of about 1000° F. or greater. If the entire volume of char fuel within the combustion chamber is heated to the rapid reaction temperature the gasifier will start almost immediately reciprocation commences and can develop full output very shortly thereafter and this may be preferred for gasifiers required to start up and load quickly. For many applications, more leisurely startup and loading are satisfactory and for these gasifiers only a portion of the char fuel need be heated up to the rapid reaction temperature. Once reciprocation has commenced, the rapid reaction of the heated char portion will further elevate its own temperature, heat up adjacent char to the rapid reaction temperature, and generate some of the work of reciprocation. As the heated portion thus spreads by char reaction and heat transfer, the work developed increases until the gasifier becomes self reciprocating and is then started. Thereafter, the continued spread of the heated and rapidly reacting portion increases gasifier cycle speed until finally the gasifier is developing full output and is ready for use. The larger the portion of char fuel initially heated up to the rapid reaction temperature, the shorter becomes the pre-start time and the more quickly the gasifier becomes ready for use.

Various external power sources can be used for the prestart reciprocation driving of the gasifier pistons. Where a connecting rod and unidirectional rotating crank synchronizer linkage, such as, 13, of FIG. 7, are used this crank can be driven by electric or pneumatic or hydraulic or spring motors, using suitable means for engagement and disengagement of the external power source, as is already well known in the art of starting internal combustion engines. Where a reciprocating synchronizer linkage, such as, 12, of FIG. 7, is used the gasifier can be compressed gas driven to reciprocate as by applying compressed gas to the bounce pistons or to the power pistons. One particular example of a compressed gas reciprocator drive scheme for gasifier starting is shown in FIG. 9 as applied to the power pistons, 1, and comprises a starting valve, 211, and handle, 212, an admission valve, 213, and drive linkage, 214, and a compressed gas supply pipe, 215. When the gasifier is to be driven for starting the power pistons, 1, are brought by hand, or otherwise, to the top dead center position, as shown in FIG. 9, and the starting valve, 211, is then opened. The admission valve, 213, is connected to the synchronizer linkage, 12, via the linkage, 216, so that the admission valve, 213, is opened every time the power pistons, 1, pass through top dead center. Hence the compressed gas from the supply pipe, 215, enters the power cylinder via the open admission valve, 213, and starting valve, 211, and acts to drive the power pistons, 1, into reciprocation, the return motion being secured by action of the bounce pistons, 10, and cylinders, 6. The pistons can be thusly driven to reciprocate so long as the starting valve, 211, remains open and once the gasifier is self running, the starting valve can be closed.

Several means for heating a portion of the char fuel in the gasifier combustion chamber for starting can be used as, for example, the following:

A. The gasifier can be equipped with an oil fuel pour scheme and fuel system as described hereinabove and can be supplied with a readily compression ignitable diesel starting fuel at lean air fuel ratio. During the pressure rise caused by burning of this starting fuel, hot oxygen will be forced into the pores of the char fuel to heat it up and eventually start the char burning rapidly. When the char is capable of rapid burning, the starting fuel can be turned off and the gasifier will then run itself on the char fuel. This oil fuel starting gasifier can also be run subsequently on char alone, on oil fuel alone or on both fuels at the same time, as described hereinabove, and this fuel flexibility is an added advantage for certain applications.

B. The combustion chamber for the solid char fuel can be equipped with electrodes so that an electric heating current can be passed through the conductive char to heat it up while the gasifier is being driven. Either DC or AC of adequate voltage can be applied across the char electrodes. Where only storage batteries are available for both driving and char heating, an inductive energy storage and release circuit, essentially similar to the typical automotive ingition circuit, can be used for the char heating with the coil built large enough to store adequate energy for release across the char volume.

C. Intake air heaters, either electric or fuel fired, can be used to achieve high intake air temperatures and consequently much higher compressed air temperatures inside the power cylinder. This high temperature compressed air will rapidly heat up the char while being forced into the char pores during the compression stroke. These intake air heaters would then preferably be turned off once the char was burning rapidly and the gasifier was running.

D. Getting the char to start burning may also be assisted by use of special "starting char" fuel which can be specially prepared with carbon oxidation catalysts, as for example, various salts of metals such as copper, iron, lead, thallium, manganese, etc. Metallic aluminum and/or magnesium particles could also be mixed in with the "starting char," not only to increase electrical conductivity but also to more rapidly heat up the char by their own burning.

E. Some chars, such as wood charcoal, have very low rapid reaction temperatures and compression during driving may alone be adequate to get the gasifier started without need of auxiliary char heating means.

Where an oil fueled starting scheme is used as in item A above, it may be preferred to add fresh char fuel together with fresh oil starting fuel more frequently during starting than the normal running refuel interval of N cycles between refuelings. For example, for the pneumatic refuel drive scheme and electric refuel interval setter, as shown in FIGS. 1, 4, and 6, a startup button, 87, can be used, as described hereinabove, to secure a refuel cycle, together with starting oil fuel pouring, at each free piston mechanism cycle.

Combinations of these and other starting methods can also be used for the startup of these char burning free piston gasifiers.

B9. Output Control:

When this char burning gasifier has been started and is running normally, gasifier output can be controlled most easily by control of compressor cylinder intake air density. Compressor intake air density can be controlled by use of an air intake throttle, or by use of an adjustable supercharger, or by use of a throttle and supercharger in combination as is well known in the art of internal combustion engines. An example of an intake air density control scheme is shown in FIG. 23 wherein the gasifier exhaust gas driven gas turbine, 217, drives the intake air supercharger, 218, and intake air density can be controlled by controlling the portion of exhaust gas passing through the gas turbine, 217, by adjusting the exhaust bypass valve, 219. As less exhaust gas passes through the turbine, 217, both it and the supercharger, 218, do less work resulting in a reduced supercharge pressure and hence air density at the compressor intake air port, 14. After all exhaust gas is bypassed away from the turbine, 217, by the bypass valve, 219, still further reductions of intake air pressure and hence density can be accomplished, if needed, by restricting intake air flow using the throttle valve, 220.

B10. Steam Admission:

In some applications of char burning free piston gasifiers, admission of steam with the air may be desired. The steam also reacts with the char, via an endothermic reaction, to form carbon monoxide and hydrogen. In a unit process gasifier with G equal to about one, these extra fuel gas components increase the energy content of the output gas and reduce the work output of the power piston. Excess steam admission can be used as a means of stopping a char burning gasifier since the steam-char reaction is endothermic and char chilling results. One scheme for such steam admission at intake is shown in FIG. 23, and comprises a steam nozzle, 221, admitting steam into the gasifier intake pipe, 14, and receiving steam from a steam boiler via a supply pipe, 222, and steam admission valve, 223.

As described in the cross-referenced patent application entitled, "Engine Steam Stratifier," it will usually be preferred to admit steam directly into the power cylinder, and during the compression process only, and adjacent to the surfaces of the char fuel mass, in order to maximize volumetric efficiencies and also to best utilize the steam. This type of steam admission can be achieved in various ways. One example of such a stratified steam admission scheme is shown partially in FIG. 1 and comprises steam admission nozzles, 224, which direct the steam over the external surface of the porous combustion chamber, 9, connecting via a timed steam admission valve, 225, to a steam supply pipe, 226, from a steam boiler. The steam admission valve, 225, is opened and closed by the linkage, 227, connecting to the synchronizer linkage, 12, and is timed to open during the compression process no earlier than the time of closing of the exhaust and intake ports of the power cylinder, and to close at the end of the compression process or very early in the expansion process following. This preferred stratified steam admission does not reduce volumetric efficiency and places the steam where it can be promptly forced by compression into the char fuel pore spaces.

B11. Stopping:

To stop these char burning gasifiers, the burning reaction between char and oxygen can be arrested or at least greatly slowed down. The char and oxygen reaction can be slowed down or arrested by removing the char from the combustion chamber, by removal or reduction of the oxygen content of the intake gases, by chilling the char mass well below its rapid reaction temperature; by use of chemical fire retardants, and by combinations of these means. A preferred means for stopping the gasifier is to connect the intake pipe to the exhaust pipe, thus greatly reducing the oxygen content of the intake gases, and the gasifier will then stop running. An example of such an exhaust gas recirculation system for stopping is shown in FIG. 23 comprising an intake selector valve, 228, with handle, 229, an exhaust selector valve, 230, with handle, 231, and a crossover pipe, 232, connecting between the intake selector valve, 228, and the exhaust selector valve, 230. For normal engine running these selector valves, 228, 230, are positioned as shown in solid outline in FIG. 23, and exhaust gas from the exhaust pipe, 20, passes via the pipe, 233, to the gas turbine, 217, which drives the intake air supercharger, 218, and is discharged via the pipe, 234, whereas the intake air entering the supercharger, 218, via the pipe, 235, passes from the supercharger through the throttle valve, 220, and into the compressor intake air port, 14. When the gasifier is to be stopped, the selector valves, 228, 230, are moved by the handles, 229, 231, into the positions shown in dashed outline in FIG. 23, and exhaust gas from the exhaust pipe, 20, passes via the crossover pipe, 232, into the intake air port, 14, and the gasifier stops since almost no oxygen will then be present in the power cylinder gases.

Alternatively, excess steam admission can be used to chill the char fuel, as described hereinabove, for the stopping of the gasifier.

The free piston gasifier can also be stopped by bleeding out the gases inside the bounce cylinder, thus reducing and eventually eliminating the ability of the bounce cylinders to return the power pistons for the compression process. An example of such a bounce cylinder stop bleed is shown in FIG. 8 comprising a stop valve, 236, and bleed orifice, 237, connected into the bounce cylinders, 6, so that when the stop valve, 236, is open, the bounce gases are bled away from both bounce cylinders, 6, via the bleed orifice, 237, and discharge pipe, 238. The bleed connection, 239, into the bounce cylinders, 6, is preferably sufficiently away from the cylinder head surface, 240, that a gas cushion always remains adequate to prevent mechanical impact of the bounce pistons, 10, with the cylinder head.

B12. Oxygen Distribution Control:

Where a char burning free piston gasifier is to be used primarily as a source of high pressure fuel gas, means for controlling the oxygen distribution ratio, G, at power piston top dead center may be preferred in order to keep the fuel gas heating value as high as possible. One example means for controlling G is shown schematically in FIG. 25 and comprises several gas bleed ports, 241, 242, 243, in each of the reverse bounce cylinders, 8, each such corresponding pair of bleed ports connecting to bleed orifices, 244, 245, 246, which connect in turn to bleed valves, 247, 248, 249, which vent to outside via vent pipes, 250, 251, 252. The bleed valves, 247, 248, 249, are opened or closed, as via solenoids and return springs, by the electronic exhaust gas analyser and controller, 253, which receives as input the sensor outputs of up to three exhaust gas composition sensors, an oxygen sensor, 254, a carbon monoxide sensor, 255, a carbon dioxide sensor, 256, these sensors being located in the exhaust pipe, 20, from the power cylinders, 2. As G varies so does the power cylinder exhaust gas composition as follows:

a. At $G=1.0$ all oxygen being inside the char pores the exhaust gas is high in carbon monoxide content and has only very little oxygen or carbon dioxide.

b. At $G=0.5$ half the oxygen is retained outside the char pores and is used to burn the carbon monoxide energing from the pores to carbon dioxide, and thus the exhaust gas is high in carbon dioxide content and has very little oxygen or carbon monoxide.

c. At G less than 0.5 excess oxygen is retained outside the char pores and thus the exhaust gas will contain appreciable oxygen as well as carbon dioxide but only very small content of carbon monoxide.

The electronic exhaust gas analyser, 253, senses the exhaust gas composition and responds by opening or closing individual bleed valves, 247, or, 248, or, 249, either to allow the power piston to move closer to the combustion chamber at the end of the compression stroke if G needs to be increased, or to prevent the power piston from approaching as close to the combustion chamber at the end of the compression stroke if G needs to be decreased. In this way the desired value of the oxygen distribution ratio, G, can be set into the analyser and controller, 253, by adjustment of the G knob, 257, and this means for controlling will hold G at or near this set value. Where the gasifier is only intended to run at G values as near to one as possible, the sensors and analyser can be simplified to sense and analyse only for carbon dioxide content of the exhaust gas.

A G value of exactly one will be mechanically impossible to achieve since this requires the power piston to just exactly touch the surface of the char fuel and actual running G values for best fuel gas heating value will necessarily be somewhat less than one. That bleed port, 243, closest to the cylinder head, 258, of the reverse bounce cylinder, 8, must be sufficiently separated therefrom that the remaining reverse bounce volume beyond that bleed is alone adequate to prevent the power piston from striking the combustion chamber at the top dead center position.

A char burning free piston gasifier using a synchronizer linkage, and not a unidirectional rotating crank, will tend to self compensate to a particular value of the oxygen distribution ratio, G, in the absence of a G control scheme. The combustion energy released per unit of oxygen placed into the power cylinder increases as the value of G decreases since a higher proportion of the oxygen is reacted to carbon dioxide. This greater energy release speeds up the cycles per minute of the free piston mechanism which, when unrestrained by the synchronizer linkage, increases the power piston compression ratio and thus increases the value of G, and this self-corrective action works in both directions of change of G. For some applications, as for example, where the free piston gasifier output is to be used in whole or part to power a gas turbine engine, it may be preferred to operate the free piston gasifier at this self-compensating value of G, which will lie somewhere between one-half and one, and a controller for G will not be needed here.

B13. Stroke Length Control:

Where it is desired to control the stroke length, l, of the pistons either a synchronizer linkage with unidirectional rotating crank can be used or bounce cylinder bleeds can be used. An example of a bounce cylinder bleed scheme for adjusting piston stroke length is shown schematically in FIG. 8 and comprises; a bounce gas supply pipe, 259, a supply orifice, 200, a bounce gas supply source, 261, and a series of bleed ports, 262, 263, 264, with bleed orifices, 265, 266, 267, and bleed valves, 268, 269, 270, set along the length of the bounce cylinder, 6. As more bounce gas is bled off via these bleed ports, less energy is stored in the bounce gas and the return stroke length is shortened. The gas lost by such bleeding is replaced at the top dead center position, the supply source tending to bring the minimum bounce cylinder pressure up to the supply source pressure. The air compressed by the free piston gasifier air compressor is one suitable supply source, 261, for the replacement bounce gas, but other compressed gas sources could also be used.

B14. Moveable Combustion Chambers:

A set of at least two moveable combustion chambers can alternatively be used instead of the fixed combustion chamber scheme. For example, two combustion chambers could be mounted in a moveable chamber block for each power cylinder. The chamber block would then be aligned so that, while one combustion chamber was open to the power cylinder gases and undergoing burning, the other combustion chamber was being refueled and having ashes removed. Subsequently, the chamber block would be moved by a drive means so that the two combustion chambers exchanged these functions. Various motion patterns of the moveable chamber block could be used such as rotary motion, linear motion, or combinations thereof. A drive means is needed to drive this moveable combustion chamber block through its cycle. Various types of drive means can be used such as described hereinabove for refuel and ash removal drive means. Preferably motion of a moveable chamber block occurs only during an exhaust and intake process of that power cylinder. Motion of the moveable chamber block occurs at intervals of an integral number of free piston mechanism cycles. This motion interval can be fixed, and then refuel quantity and ash removal quantity may be varied. Alternatively, this motion interval can be adjustable and any of the ash level sensor schemes described herein can be used to adjust the motion interval so that best oxygen utilization is achieved and so that best char burning results. Refueling and ash removal are to occur only when the moveable chamber block is stationary. Means for sealing against gas leakage are needed between the power cylinder and the moveable chamber block and seals suitable for this purpose are already well known in the art. Any of the ash level sensor schemes described hereinabove can be used, with a suitable control device, to initiate the motion of the moveable combustion chamber block, as by engaging the moveable chamber drive means. One advantage of this moveable combustion chamber scheme is that the refuel block and the ash removal block can be stationary. Alternatively the refuel and ash removal blocks can be stationary during the refuel and ash removal processes but can then be moved on to another power cylinder so that a single refuel mechanism and a single ash removal mechanism can serve several power cylinders. A further advantage of the moveable combustion chamber scheme is that the refuel and ash removal processes can take place at ambient pressures and in a leisurely manner with consequently reduced inertia forces in these mechanisms. A disadvantage of this moveable combustion chamber scheme is that heat losses from the combustion chamber will be increased by the presence of the extra chamber being refueled and having ashes removed. For this reason, the time interval that a combustion chamber remains outside the power cylinder must be limited to avoid chilling the char fuel therein to below its rapid burning temperature.

One particular example of a moveable combustion chamber scheme is shown in FIG. 24 and comprises two combustion chambers, 271 and 272, mounted in the moveable chamber block, 273. As shown in FIG. 24 the combustion chamber, 271, is positioned inside the power cylinder, 2, and char burning will occur in this combustion chamber when the power piston rises during compression. The other combustion chamber, 272, is positioned outside the power cylinder and aligned with a refuel mechanism, 274, and an ash removal mechanism, 275, whose details are not shown in FIG. 24. After the end of a motion interval the moveable chamber block, 273, is then moved via the connection, 276, by the chamber block drive means so that the combustion chamber, 272, is inside the power cylinder, 2, and so that the combustion chamber, 271, is outside the power cylinder and aligned with a refuel mechanism, 277, and an ash removal mechanism, 278. Refuel and ash removal occur only while the moveable chamber block, 273, is stationary. Sealing means, 279 and 280, prevent gas leakage. Various kinds of drive means can be used to drive the moveable chamber block via the connection, 276, such as described herein for refuel drive means and ash removal drive means, and these drive means can be single speed or dual speed drive means, but are preferably single cycle drive means. A ceramic shield, 281, keeps char fuel and ashes from reaching the power cylinder, 2.

B15. Sizing:

For purposes of sizing a char burning free piston gas generator the following approximate relations can be used. The gasifier output can be calculated in terms of the net air mass flowing through the gasifier per unit of time, (ma), as follows:

$$(ma) = \frac{(PO)}{R(TO)} (AAC)(I)(evp)(cpm)$$

Wherein R is the gas constant, TO, is the air temperature at gasifier intake and cpm is the free piston mechanism cycle rate in cycles per unit of time. The free piston mechanism cycle rate, cpm, can be calculated from a force and work balance on the moving piston assembly to determine travel time between dead centers but this calculation apparently requires numerical integration. The following relation gives a rough approximation to the value of cpm:

$$(cpm) = .093 \sqrt{\frac{g(AP)(PC)}{(l)(WP)}}$$

Wherein g is the gravitational conversion factor and (WP) is the piston assembly weight. Where the compression ratio of the power cylinder, PCR, is known the following relation yields a closer approximation to the value of cpm within the usual range of values of PCR:

$$(cpm) = .0137 (PCR) \sqrt{\frac{g(AP)(PC)}{(K-1)(PCR-1)(l)(WP)}}$$

Both of the foregoing relations for cpm are for the case where air compression occurs during the expansion stroke of the power piston and where bounce piston and power piston areas and compression ratios are not too widely different. For other cases the numerical integration can be used. The air compressor discharge pressure, PC, which is the power cylinder intake pressure can be estimated from a work balance between the air compression work and the cycle work of the power cylinder process yielding the following approximate relation:

$$\left[\frac{(PC)}{(PO)}\right]^{\frac{K-1}{K}} = \left[\frac{(au)(epc)(QR)(eca)(K-1)}{R(TO)K} + 1\right]$$

Wherein epc is the thermal efficiency of the power cylinder process, QR is the net heat of reactions inside the power cylinder per unit mass of air therein, and eca is the adiabatic efficiency of the air compressor. The value of epc can usually be estimated at about 60 percent of the air standard Otto cycle efficiency at the same compression ratio, PCR. The net heat of reaction, QR, depends upon the value of G being used and also on the mol ratio of steam to oxygen inside the char pores, a, or on the ratio of steam to oxygen in the power cylinder which is aG. For char fuels containing only carbon as a fuel element, QR can be estimated in BTU per pound of air as follows:

$$(QR) = 1762 - 529aG - 1067G \text{ BTU/lb. air}$$

Various specific forms of char burning free piston gas generators have been described hereinabove as illustrative examples but it is not intended thereby to limit the invention to these examples.

Having thus described my invention what I claim is:

1. A free piston gas generator comprising:

a free piston mechanism comprising a power cylinder with a number of power pistons operative within each such power cylinder equal to two minus the number of cylinder heads on said power cylinder, said number of cylinder heads not exceeding one, each such power piston and each such cylinder head comprising a compressing surface with said compressing surfaces facing toward each other;

a combustion chamber secured inside the power cylinder of said free piston mechanism and comprising; means for containing char fuel and ashes so that said char fuel and ashes are mechanically separated from the power cylinder and power piston; said means for containing further comprising a refuel end through which refueling takes place, said means for containing further comprising gas flow passages which connect from that interior space of said containing means within which the char fuel and ashes are contained to that interior space of said power cylinder contained by said power cylinder and said compressing surfaces; each free piston gas generator being equipped with at least one of said combustion chambers for each free piston mechanism;

A refuel mechanism comprising; means for sealing that refuel end of said means for containing char fuel and ashes, through which refueling takes place, against gas leakage during compression and expansion processes; means for refueling fresh char fuel at intervals into said means for containing char fuel and ashes; each free piston gas generator being equipped with at least one of said refuel mechanisms for each free piston mechanism;

a reload mechanism comprising: means for reloading a quantity of fresh char fuel into said means for refueling after each such refueling; each free piston gas generator being served by at least one reload mechanism.

2. A free piston gas generator comprising:

a free piston mechanism comprising a power cylinder with a number of power pistons operative within each such power cylinder equal to two minus the number of cylinder heads on said power cylinder, said number of cylinder heads not exceeding one, each such power piston and each such cylinder head comprising a compressing surface with said compressing surfaces facing toward each other, said free piston mechanism further comprising a synchronizer linkage;

a combustion chamber secured inside the power cylinder of said free piston mechanism and comprising; means for containing char fuel and ashes so that said char fuel and ashes are mechanically separated from the power cylinder and power piston; said means for containing further comprising a refuel end through which refueling takes place, said means for containing further comprising gas flow passages which connect from that interior space of said containing means within which the char fuel and ashes are contained to that interior space of said power cylinder contained by said power cylinder and said compressing surfaces; each free piston gas generator being equipped with at least one of said combustion chambers for each free piston mechanism;

a refuel mechanism comprising; means for sealing that refuel end of said means for containing char fuel and ashes, through which refueling takes place, against gas leakage during compression and expansion processes; means for refueling fresh char fuel at intervals into said means for containing char fuel and ashes, said means for refueling comprising: a refuel block and a refuel block drive; said refuel block comprising; means for adding fresh char fuel into said means for containing char fuel and ashes; said refuel block drive comprising; means for driving said refuel block through a refuel cycle at the end of each refuel interval; each free piston gas generator being equipped with at least one of said refuel mechanisms for each free piston mechanism;

a reload mechanism comprising; means for reloading a quantity of fresh char fuel into said means for refueling after each such refueling; each free piston gas generator being served by at least one reload mechanism.

3. A free piston gas generator as described in claim 1, wherein said means for containing further comprises an ash removal end through which ash removal takes place;

and further comprising:

an ash removal mechanism comprising; means for sealing that ash removal end of said combustion chamber, through which ash removal takes place, against gas leakage during compression and expansion processes; means for removing a quantity of ashes from said combustion chamber; means for dumping said removed quantity of ashes outside the gas generator;

means for controlling the density of the air supplied to said free piston gas generator in order to control the quantity of gas generated.

4. A free piston gas generator as described in claim 2, wherein said means for containing further comprises an ash removal end through which ash removal takes place;

and further comprising:

an ash removal mechanism comprising; means for sealing that ash removal end of said combustion chamber, through which ash removal takes place, against gas leakage during compression and expansion processes; an ash removal block and an ash removal block drive means; said ash removal block comprising; means for removing a quantity of ashes from said combustion chamber at intervals; means for dumping said removed quantity of ashes outside the gas generator; said ash removal block drive means comprising: means for driving said ash removal block through an ash removal cycle at the end of each ash removal interval;

means for controlling the density of the air supplied to said free piston gas generator in order to control the quantity of gas generated.

5. A free piston gas generator as described in claim 1, wherein said means for containing further comprises an ash removal end through which ash removal takes place;

and further comprising:

an ash removal mechanism comprising; means for sealing that ash removal end of said combustion chamber, through which ash removal takes place, against gas leakage during compression and expansion processes;

means for removing a quantity of ashes from said combustion chamber in the molten state; means for dumping said removed quantity of ashes outside the gas generator;

means for unsealing the gas leakage sealing means at the ash removal end of said combustion chamber when the free piston gas generator is about to be stopped, so that ashes can be blown down out of said combustion chamber before the free piston gas generator has stopped;

means for controlling the density of the air supplied to said free piston gas generator in order to control the quantity of gas generated.

6. A free piston gas generator as described in claim 1, and further comprising:

means for placing a quantity of oil fuel on material about to be placed into said combustion chamber by said refuel mechanism, prior to the early portions of that compression process next following said placement of said material into said combustion chamber.

7. A free piston gas generator as described in claim 4, and further comprising:

means for placing a quantity of oil fuel on material about to be placed into said combustion chamber by said refuel mechanism, prior to the early portions of that compression process next following said placement of said material into said combustion chamber;

means for controlling said quantity of oil fuel in proportion to air density at intake to the power pistons;

means for recycling unburned portions of said material from said ash removal mechanism back into said means for reloading said refuel mechanism so that said unburned portions are again placed into said combustion chamber by said refuel mechanism;

and further within said refuel mechanism displaces a fixed volume at each refueling;

and further wherein said means for removing a quantity of ashes from said combustion chamber does so at intervals and displaces a fixed volume at each ash removal, said fixed displacement volume of ash removal being essentially equal to said fixed displacement volume of refueling;

and further wherein said refueling and said removal of ashes occur at the same time;

and further wherein said interval of refueling is equal to said interval of ash removal and both intervals are a fixed integral number of engine revolutions.

8. A free piston gas generator as described in claim 1, 2, 3, 4, 5, 6, or 7, and further comprising:

means for starting said free piston gas generator comprising; means for driving of the free piston mechanism through a series of starting cycles; means for heating a portion of the char fuel within said combustion chamber to that temperature at which char will react rapidly with oxygen in adjacent compressed air, during said series of starting cycles;

means for stopping said free piston gas generator.

9. A free piston gas generator as described in claim 1, 2, 3, 4, 5, 6, or 7, wherein said free piston mechanism further comprises bounce cylinders with bounce pistons operative therein;

and further comprising:

means for starting said free piston gas generator comprising; means for driving of the free piston mechanism through a series of starting cycles, means for heating a portion of the char fuel within said combustion chamber to that temperature at which char will react rapidly with oxygen in adjacent compressed air, during said series of starting cycles, said driving through said starting cycles being accomplished by admitting high pressure gas into the power cylinder whenever the power pistons are near to their top dead center positions, until the gas generator can run itself and is started;

means for stopping said free piston gas generator comprising; means for releasing gases out of the bounce cylinders of said free piston gas generator.

10. A free piston gas generator as described in claim 1, 2, 3, 4, 5, 6, or 7, and further comprising:

means for starting said free piston gas generator comprising; means for driving of the free piston mechanism through a series of starting cycles, means for heating a portion of the char fuel within said combustion chamber to that temperature at which char will react rapidly with oxygen in adjacent compressed air, during said series of starting cycles, said driving through said starting cycles being accomplished by admitting high pressure gas into the power cylinder whenever the power pistons are near to their top dead center positions, until the gas generator can run itself and is started;

means for stopping said free piston gas generator comprising, means for slowing down the reaction of char and oxygen when the free piston gas generator is to be stopped.

11. A free piston as generator as described in claim 1, 2, 3, 4, 5, 6, or 7, and further comprising:

means for reducing the oxygen content of the power piston intake gases when the free piston gas generator is to be stopped.

12. A free piston gas generator as described in claim 1, 2, 3, 4, 5, 6, or 7, and further comprising:

means for supplying steam;

means for slowing down the reaction of char and oxygen when the free piston gas generator is to be stopped, by increasing the steam content of the gases within the power cylinder.

13. A free piston gas generator as described in claim 1, 2, 3, 4, 5, 6, or 7, and further comprising:

means for starting said free piston gas generator comprising; means for driving of the free piston mechanism through a series of starting cycles, said driving through said starting cycles being accomplished by admitting high pressure gas into the power cylinder whenever the power pistons are near to their top dead center positions, until the gas generator can run itself and is started;

means for driving said refuel mechanism to carry out a number of startup refuel cycles during said series of starting cycles, said number of startup refuel cycles being no more than the number of starting cycles and no less than the number of refuel cycles occurring during the same number of free piston mechanism cycles when the gas generator is started and running itself;

means for stopping said free piston gas generator.

14. A free piston gas generator as described in claim 1, 2, 3, 4, 5, 6, or 7, and further comprising:

means for supplying steam:

means for admitting steam into the power cylinder of said free piston gas generator;

means for controlling the quantity of steam admitted per cycle into the power cylinder.

15. A free piston gas generator comprising:

a free piston mechanism comprising a power cylinder with a number of power pistons operative within each such power cylinder equal to two minus the number of cylinder heads on said power cylinder, said number of cylinder heads not exceeding one, each such power piston and each such cylinder head comprising a compressing surface with said compressing surfaces facing toward each other, said free piston mechanism further comprising a synchronizer linkage;

a combustion chamber secured inside the power cylinder of said free piston mechanism and comprising; means for containing char fuel and ashes so that said char fuel and ashes are mechanically separated from the power cylinder and power piston; said means for containing further comprising a refuel end through which refueling takes place and an ash removal end through which ash removal takes place, said means for containing further comprising gas flow passages which connect from that interior space of said containing means within which the char fuel and ashes are contained to that interior space of said power cylinder contained by said power cylinder and said compressing surfaces; each free piston gas generator being equipped with at least one of said combustion chambers for each free piston mechanism;

a refuel mechanism comprising; means for sealing that refuel end of said means for containing char fuel and ashes, through which refueling takes place, against gas leakage during compression and expansion processes; means for refueling fresh char fuel at intervals into said means for containing char fuel and ashes, said means for refueling comprising; a refuel block and a refuel block drive; said refuel block comprising; means for adding fresh char fuel into said means for containing char fuel and ashes so that said containing means is filled at each refueling; said refuel block drive comprising means for driving said refuel block through a refuel cycle at the end of each refuel interval, said refuel interval being a fixed integral number of free piston mechanism cycles; each free piston gas generator being equipped with at least one of said refuel mechanisms for each free piston mechanism;

a reload mechanism comprising; means for reloading a quantity of fresh char fuel into said means for refueling so that said refuel means is filled at each reloading after each such refueling; each free piston gas generator being served by at least one reload mechanism;

an ash removal mechanism comprising; means for sealing that ash removal end of said combustion chamber, through which ash removal takes place, against gas leakage during compression and expansion processes; means for removing a quantity of ashes from said combustion chamber at intervals; means for dumping said removed quantity of ashes outside the gas generator; said ash removal interval being adjustable;

means for adjusting said ash removal interval comprising; means for sensing the char fuel volume within the combustion chamber, and controlling the ash removal interval so that the char volume within said combustion chamber is small enough to assure essentially maximum possible reaction of char fuel while within said combustion chamber, and is large enough to assure essentially maximum possible reaction of available oxygen with char fuel within said combustion chamber;

means for starting said free piston gas generator comprising; means for driving of the free piston mechanism through a series of starting cycles, said driving through said starting cycles being accomplished by admitting high pressure gas into the power cylinder whenever the power pistons are near to their top dead center positions, until the gas generator can run itself and is started; means for heating a portion of the char fuel within said combustion chamber to that temperature at which char will react rapidly with oxygen in adjacent compressed air, during said series of starting cycles;

means for controlling the density of the air supplied to said free piston gas generator, in order to control the quantity of gas generated, by controllably compressing said air supplied;

means for stopping said free piston gas generator.

16. A free piston gas generator comprising:

a free piston mechanism comprising a power cylinder with a number of power pistons operative within each such power cylinder equal to two minus the number of cylinder heads on said power cylinder, said number of cylinder heads not exceeding one, each such power piston and each such cylinder head comprising a compressing surface with said compressing surfaces facing toward each other, said free piston mechanism further comprising bounce cylinders with bounce pistons operative therein, said free piston mechanism further comprising a synchronizer linkage;

a combustion chamber secured inside the power cylinder of said free piston mechanism and comprising; means for containing char fuel and ashes so that said char fuel and ashes are mechanically separated from the power cylinder and power piston; said means for containing further comprising a refuel end through which refueling takes place and an ash removal end through which ash removal takes place; said means for containing further comprising gas flow passages which connect from that interior space of said containing means within which the char fuel and ashes are contained to that interior space of said power cylinder contained by said power cylinder and said compressing surfaces; each free piston gas generator being equipped with at least one of said combustion chambers for each free piston mechanism;

a refuel mechanism comprising:

means for sealing that refuel end of said means for containing char fuel and ashes, through which refueling takes place, against gas leakage during compression and expansion processes;

means for refueling fresh char fuel at intervals into said means for containing char fuel and ashes; said means for refueling comprising; a refuel block and a refuel block drive; said refuel block comprising; means for adding fresh char fuel into said means for containing char fuel and ashes so that said containing means for char fuel and ashes is filled at each refueling; said refuel block drive comprising; means for driving said refuel block through a refuel cycle at the end of each refuel interval; said refuel interval being a fixed integral number of free piston mechanism cycles; each free piston gas generator being equipped with at least one of said refuel mechanisms for each free piston mechanism;

a reload mechanism comprising: means for reloading a quantity of fresh char fuel into said means for refueling so that said refuel means is filled at each reloading after each such refueling; each free piston gas generator being served by at least one reload mechanism;

an ash removal mechanism comprising: means for sealing that ash removal end of said combustion chamber, through which ash removal takes place, against gas leakage during compression and expansion processes; means for removing a quantity of ashes from said combustion chamber in the molten state; means for dumping said removed quantity of ashes outside the gas generator;

means for starting said free piston gas generator comprising:

means for driving of the free piston mechanism through a series of starting cycles, said driving through said starting cycles being accomplished by admitting high pressure gas into the power cylinder whenever the power pistons are near to their top dead center positions until the gas generator can run itself and is started;

means for heating a portion of the char fuel within said combustion chamber to that temperature at which char will react rapidly with oxygen in adjacent compressed air, during said series of starting cycles;

means for controlling the density of the air supplied to said free piston gas generator, in order to control the quantity of gas generated, by controllably compressing said air supplied;

means for stopping said free piston gas generator comprising:

means for releasing gases out of the bounce cylinders of said free piston gas generator;

means for unsealing the gas leakage sealing means at the ash removal end of said combustion chamber when the free piston gas generator is about to be stopped so that ashes can be blown down out of said combustion chamber before the free piston gas generator has stopped.

17. A free piston gas generator comprising:

a free piston mechanism comprising a power cylinder with a number of power pistons operative within each such power cylinder equal to two minus the number of cylinder heads on said power cylinder, said number of cylinder heads not exceeding one, each such power piston and each such cylinder head comprising a compressing surface with said compressing surfaces facing toward each other, said free piston mechanism further comprising bounce cylinders with bounce pistons operative therein, said free piston mechanism further comprising a synchronizer linkage;

a combustion chamber secured inside the power cylinder of said free piston mechanism and comprising; means for containing char fuel and ashes so that said char fuel and ashes are mechanically separated from the power cylinder and power piston; said means for containing further comprising a refuel end through which refueling takes place and an ash removal end through which ash removal takes place; said means for containing further comprising gas flow passages which connect from that interior space of said containing means within which the char fuel and ashes are contained to that interior space of said power cylinder contained by said power cylinder and said compressing surfaces; each free piston gas generator being equipped with at least one of said combustion chambers for each free piston mechanism;

a refuel mechanism comprising:

means for sealing that refuel end of said means for containing char fuel and ashes, through which refueling takes place, against gas leakage during compression and expansion processes;

means for refueling fresh char fuel at intervals into said means for containing char fuel and ashes, said means for refueling comprising: a refuel block and a refuel block drive; said refuel block comprising: means for adding fresh char fuel into said means for containing char fuel and ashes, said means for adding fresh char fuel displacing a fixed volume at each refueling; said refuel block drive comprising: means for driving said refuel block through a refuel cycle at the end of each refuel interval; each free piston gas generator being equipped with at least one of said refuel mechanisms for each free piston mechanisms;

means for placing a quantity of oil fuel on material about to be placed into said combustion chamber by said refuel mechanism, prior to the early portions of that compression process next following said placement of said material into said combustion chamber;

means for controlling said quantity of oil fuel in proportion to air density at intake to the power pistons;

a reload mechanism comprising: means for reloading a quantity of fresh char fuel into said means for refueling after each such refueling; each free piston gas generator being served by at least one reload mechanism;

an ash removal mechanism comprising: means for sealing that ash removal end of said combustion chamber, through which ash removal takes place, against gas leakage during compression and expansion processes; means for removing a quantity of ashes from said combustion chamber at intervals; means for recycling unburned portions of said material from said ash removal mechanism back into said means for reloading said refuel mechanism, so that said unburned portions are again placed into said combustion chamber by said refuel mechanism;

wherein said refuel mechanism displaces a fixed volume at each refueling; wherein said means for removing a quantity of ashes from said combustion chamber does so at intervals and displaces a fixed volume at each ash removal; said fixed displacement volume of ash removal being essentially equal to said fixed displacement volume of refueling; wherein said interval of refueling is equal to said interval of ash removal and both intervals are a fixed integral number of engine revolutions;

means for starting said free piston gas generator comprising: means for driving said free piston mechanism through a series of starting cycles, said driving through said starting cycles being accomplished by admitting high pressure gas into the power cylinder whenever the power pistons are near to their top dead center positions, until the gas generator can run itself and is started; means for driving said refuel mechanism to carry out a number of startup refuel cycles during said series of starting cycles, said number of startup refuel cycles being no more than the number of starting cycles and no less than the number of refuel cycles occurring during the same number of free piston mechanism cycles when the gas generator is started and running itself;

means for controlling the density of the air supplied to said free piston gas generator in order to control the quantity of gas generated by controllably compressing said air supplied;

means for stopping said free piston gas generator comprising means for releasing gases out of the bounce cylinders of said free piston gas generator.

18. A free piston gas generator as described in claim 1, 2, 3, 4, 5, 6, 7, 15, 16, or 17, and further comprising:
means for supplying steam;
means for delivering said steam into the power cylinder of said free piston gas generator after commencement of each intake process and before commencement of the next following expansion process;
means for controlling the quantity of steam admitted per cycle into the power cylinder.

19. A free piston gas generator as described in claim 1, 2, 3, 4, 5, 6, 7, 15, 16, or 17, and further comprising:
means for supplying steam;
means for delivering said steam equally into each power cylinder commencing after commencement of the power cylinder compression process, and stopping prior to the end of the power cylinder compression process;
means for timing and positioning said steam delivery so that it occurs largely into that power cylinder intake air mass which goes into the solid carbon pore spaces within the combustion chamber containing means;
means for controlling said delivered steam quantity to be approximately proportional to that power cylinder intake air quantity which goes into said solid carbon pore spaces.

20. A free piston gas generator as described in claim 1, 2, 3, 4, 5, 6, or 7, and further comprising:
means for mechanically separating burning char fuel from ashes, said means for mechanical separation being a grate.

21. A free piston gas generator as described in claim 1, 2, 3, 4, 5, 6, or 7, wherein said free piston mechanism further comprises reverse bounce cylinders with reverse bounce pistons operative therein;
and further comprising:
means for controlling the oxygen distribution ratio at power piston top dead center comprising gas bleed flow passages out of the reverse bounce cylinders and means for adjusting the area of said gas bleed flow passages.

22. A free piston gas generator as described in claim 1, 2, 3, 4, 5, 6, 7, 15, 16, or 17, wherein said free piston mechanism further comprises reverse bounce cylinders with reverse bounce pistons operative therein;
and further comprising:
means for controlling the oxygen distribution ratio at power piston top dead center comprising; means for sensing the composition of the exhaust gas leaving the power cylinder, and control means, responsive to said means for sensing exhaust gas composition, which adjusts the gas bleed flow area out of the reverse bounce cylinders, so that said oxygen distribution ratio remains essentially constant.

23. A free piston gas generator as described in claim 1, 2, 3, 4, 5, 6, 7, 15, 16, or 17, wherein said free piston mechanism further comprises bounce cylinders with bounce pistons operative therein;
and further comprising:
means for controlling the length of stroke of the pistons comprising; means for supplying gas into the bounce cylinders; means for bleeding gas out of the bounce cylinders, means for adjusting the ratio of gas supply rate to gas bleed rate.

24. A free piston gas generator as described in claim 1, 2, of 6, and further comprising:
means for controlling the density of the air supplied to said free piston gas generator in order to control the quantity of gas generated.

25. A free piston gas generator as described in claim 36, and further comprising:

at least two combustion chambers located within at least one moveable chamber block for each power cylinder, with said combustion chambers being mounted into said moveable chamber blocks so that each combustion chamber is positioned inside the power cylinder at at least one position within the range of motion of said moveable chamber blocks, and so that each combustion chamber is positioned outside the power cylinder at at least one other position within the range of motion of said moveable chamber blocks;

means for sealing against gas leakage between the power cylinder and said moveable chamber block during compression and expansion processes;

means for adding fresh fuel into each combustion chamber when it is positioned outside the power cylinder and is stopped, said means for adding being said refuel mechanism;

means for removing a quantity of ashes from each combustion chamber when it is positioned outside the power cylinder and is stopped, said means for removing being said ash removal mechanism;

means for dumping said removed quantity of ashes outside the free piston gasifier;

means for reloading a quantity of fresh char fuel into said refuel mechanism after each combustion chamber is refueled, said means for reload being said reload mechanism;

drive means for moving said moveable chamber block so that whenever said moveable chamber block motion is stopped, at least one combustion chamber is positioned inside the power cylinder, and at least one combustion chamber is positioned outside the power cylinder, said moveable chamber block motion occurring at intervals of an integral number of free piston mechanism cycles;

each free piston gasifier being equipped with at least one refuel mechanism;

each free piston gasifier being equipped with at least one ash removal mechanism;

each combustion chamber being refueled by at least one refuel mechanism;

each combustion chamber having its ashes removed by at least one ash removal mechanism;

each refuel mechanism being served by at least one reload mechanism.

26. A free piston gas generator as described in claim 25, wherein:

said integral number of cycles of said moveable chamber block motion interval are adjustable;

and further comprising:

an ash level sensor and control comprising; means for sensing the char fuel volume within the power cylinder, and means for adjusting the moveable chamber block motion interval of cycles so that the char fuel volume within the power cylinder is small enough to assure essentially maximum possible reaction of char fuel while within a combustion chamber, and is large enough to assure essentially maximum possible reaction of available oxygen with char fuel within a combustion chamber.

27. A free piston gas generator as described in claim 1, 2, 3, 4, 5, 6, or 7, wherein:

said means for refueling fills said containing means at each refueling;

said means for reloading fills said refueling means at each reloading.

28. A free piston gas generator as described in claim 1, 2, 3, or 4, and further comprising:

means for adjusting said fresh char fuel quantity thusly reloaded to maintain a total char fuel quantity within said combustion chamber adequate to assure essentially maximum possible reaction of available oxygen with char fuel, and to assure essentially maximum possible reaction of char fuel while within said combustion chamber.

29. A free piston gas generator as described in claim 1, 2, 3, or 4, wherein:

said means for reloading comprises a fuel charging mechanism, an air density sensor and control and an ash level sensor and control;

said fuel charging mechanism comprising; means for transferring a quantity of fresh char fuel from a fuel supply hopper into said refuel mechanism, setting the quantity of fresh char fuel so transferred, and processing said transferred fresh char fuel quantity, after each refueling;

said air density sensor and control comprising; means for sensing the air density at intake of the power pistons and adjusting said quantity setting means of said fuel charging mechanism so that the quantity of fresh char fuel transferred at each reloading into said refuel mechanism is proportional to said density of said intake air to the power pistons;

said ash level sensor and control comprising; means for sensing the ash zone level within said combustion chamber and adjusting said quantity setting means of said fuel charging mechanism so that, the ash zone level within said combustion chamber is deep enough within said combustion chamber to assure essentially maximum possible reaction of char fuel while within said combustion chamber, and is low enough within said combustion chamber to assure essentially maximum possible reaction of available oxygen with char fuel within said combustion chamber.

30. A free piston gas generator as described in claim 1, 2, 3, or 4, wherein:

said refuel interval is adjustable;

and further wherein:

said means for adding fresh char fuel displaces a fixed volume at each refueling;

and further comprising:

a refuel interval setter comprising a cycles counter and refuel initiator, an air density sensor and control, and an ash level sensor and control;

said cycles counter and refuel initiator comprising; means for counting free piston mechanism cycles up to that refuel interval of cycles set by said air density and ash level controls, and then engaging the refuel drive means to carry out a refuel cycle, and resetting itself to start counting the next refuel interval of cycles;

said air density sensor and control comprising; means for sensing the air density at power piston intake and setting said refuel interval of cycles so that said refuel interval is inversely proportional to the density of the power piston intake air and is an integral number of free piston mechanism cycles;

said ash level sensor and control comprising; means for sensing the ash zone level within said combustion chamber and adjusting said refuel interval of cycles so that, the ash zone level within said combustion chamber is deep enough within said combustion chamber to assure essentially maximum possible reaction of char fuel while within said combustion chamber, and is low enough within said combustion chamber to assure essentially maximum possible reaction of available oxygen with char fuel within said combustion chamber;

each free piston gas generator being equipped with at least one refuel interval setter and each free piston mechanism being served by at least one refuel interval setter.

31. A free piston gas generator as described in claim 4, wherein:

said means for adding fresh char fuel displaces a fixed volume at each refueling;

and further wherein:

said ash removal mechanism means for removing a quantity of ashes removes ashes so that said removing takes place at the same time that said refuel mechanism means for refueling is refueling fresh char fuel into said combustion chamber, and the displacement of said ash removal mechanism equals the displacement of said refuel mechanism;

and further comprising:

a refuel interval setter comprising a cycles counter and refuel initiator, an air density sensor and control, and an ash level sensor and control;

said cycles counter and refuel initiator comprising; means for counting free piston mechanism cycles up to that refuel interval of cycles set by said air density and ash level controls, and then engaging the refuel drive means to carry out a refuel cycle, and resetting itself to start counting the next refuel interval of cycles;

said air density sensor and control comprising; means for sensing the air density at power piston intake and setting said refuel interval of cycles so that said refuel interval is inversely proportional to the density of the power piston intake air and is an integral number of free piston mechanism cycles;

said ash level sensor and control comprising means for sensing the ash zone level within said combustion chamber and adjusting said refuel interval of cycles so that, the ash zone level within said combustion chamber is deep enough within said combustion chamber to assure essentially maximum possible reaction of char fuel while within said combustion chamber, and is low enough within said combustion chamber to assure essentially maximum possible reaction of available oxygen with char fuel within said combustion chamber;

each free piston gas generator being equipped with at least one refuel interval setter and each free piston mechanism being served by at least one refuel interval setter.

32. A free piston gas generator as described in claim 4, wherein:

said ash removal interval is adjustable;

and further comprising:

means for setting said interval of ash removal to be whenever a certain quantity of ashes has accumulated within said combustion chamber.

33. A free piston gas generator as described in claim 4, wherein:

said ash removal interval is adjustable;

and further comprising:

means for sensing the char fuel volume within the combustion chamber and adjusting the ash removal interval so that, the char volume within said combustion chamber is small enough to assure essentially maximum possible reaction of char fuel while within said combustion chamber, and is large enough to assure essentially maximum possible reaction of available oxygen with char fuel within said combustion chamber.

34. A free piston gas generator as described in claim 4, wherein:

said ash removal interval is a fixed integral number of free piston mechanism cycles.

* * * * *